(12) United States Patent
Yao et al.

(10) Patent No.: US 10,810,263 B2
(45) Date of Patent: Oct. 20, 2020

(54) USER INTERFACE FOR ACCESSING HIERARCHICAL DATA

(71) Applicant: SAP SE, Walldorf (DE)

(72) Inventors: Cheng Yu Yao, Richmond (CA); Nan Xuan Wang, Surrey (CA); Henry Lo, Surrey (CA)

(73) Assignee: SAP SE, Walldorf (DE)

( * ) Notice: Subject to any disclaimer, the term of this patent is extended or adjusted under 35 U.S.C. 154(b) by 43 days.

(21) Appl. No.: 16/212,419

(22) Filed: Dec. 6, 2018

(65) Prior Publication Data
US 2020/0183979 A1 Jun. 11, 2020

(51) Int. Cl.
G06F 16/904 (2019.01)
G06F 3/0482 (2013.01)
G06F 3/0484 (2013.01)

(52) U.S. Cl.
CPC .......... *G06F 16/904* (2019.01); *G06F 3/0482* (2013.01); *G06F 3/0484* (2013.01)

(58) Field of Classification Search
CPC ................. G06F 16/174; G06F 16/24537
See application file for complete search history.

(56) References Cited

U.S. PATENT DOCUMENTS

| | | | |
|---|---|---|---|
| 2006/0126629 A1* | 6/2006 | Dooley | H04L 29/12283 370/392 |
| 2009/0049372 A1* | 2/2009 | Goldberg | G06F 40/18 715/227 |
| 2015/0262396 A1* | 9/2015 | Devarajan | G06F 16/248 345/440.1 |
| 2017/0286184 A1* | 10/2017 | Semenov | G06F 9/52 |

* cited by examiner

*Primary Examiner* — Rayeez R Chowdhury
(74) *Attorney, Agent, or Firm* — Mintz Levin Cohn Ferris Glovsky and Popeo, P.C.

(57) ABSTRACT

A method for providing a visual representation of data stored in a database may include generating a graphic user interface configured to receive inputs for constructing a hierarchical measure based on the data stored in the database. An indication to add, to the hierarchical measure, a first measure and a second measure may be received via the graphic user interface. In response to the indication, the hierarchical measure may be constructed to include, based on the first measure being added prior to the second measure, the first measure as a parent measure and the second measure as a child measure. A first value of the first measure may correspond to an aggregate of at least a second value of the second measure. The graphic user interface may be updated to provide a visual representation of the hierarchical measure. Related systems and articles of manufacture are also provided.

18 Claims, 21 Drawing Sheets

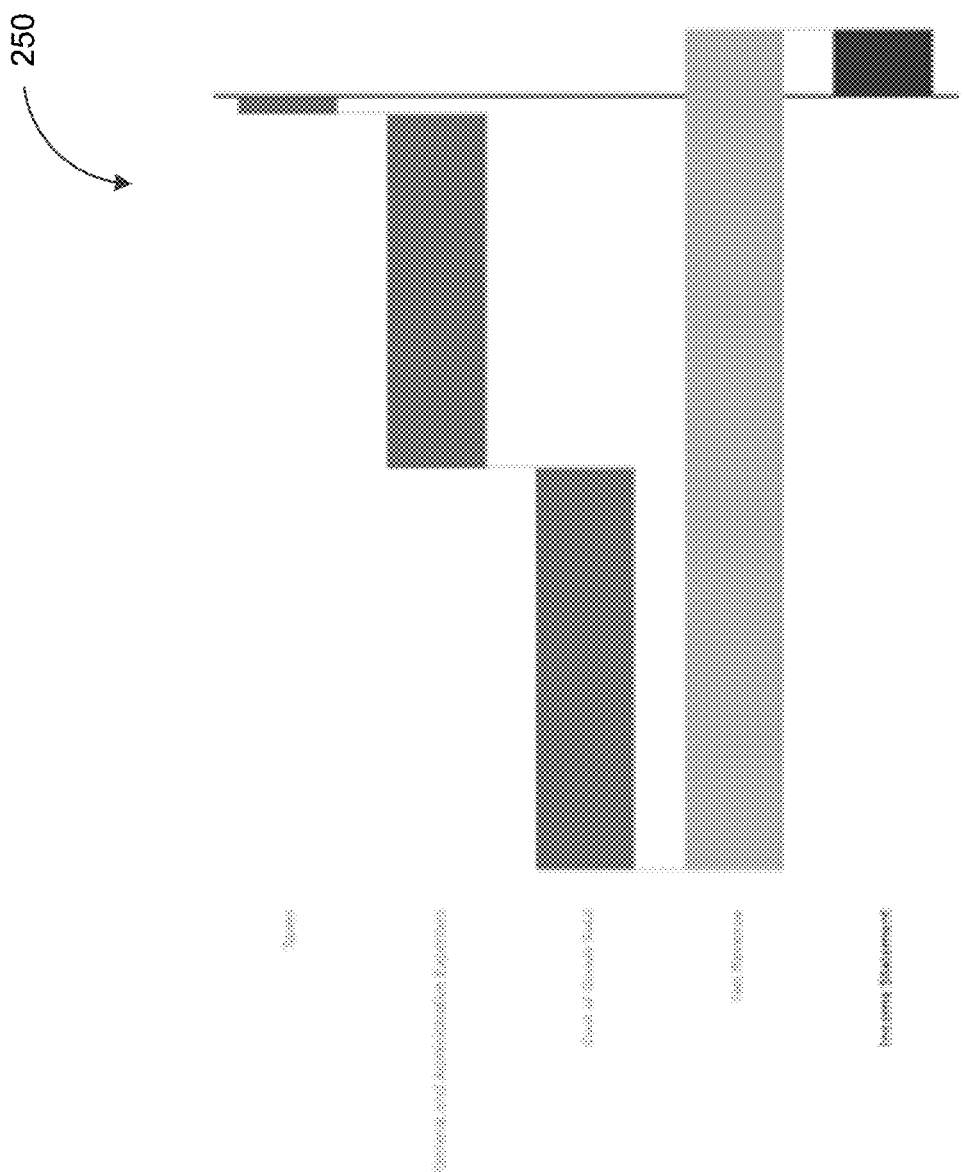

USER INTERFACE FOR ACCESSING HIERARCHICAL DATA

TECHNICAL FIELD

The subject matter described herein relates generally to database processing and more specifically to a user interface for accessing hierarchy data stored in a database.

BACKGROUND

A database may be configured to store a plurality of electronic data records. These data records may be organized, in accordance with a database schema, into various database objects including, for example, one or more database tables. The database is coupled with a database management system (DBMS), which may be configured to support a variety of database operations for accessing the data records stored in the database. These database operations may include, for example, structured query language (SQL) queries and/or the like.

SUMMARY

Systems, methods, and articles of manufacture, including computer program products, are provided for accessing hierarchical data stored in a database. In one aspect, there is provided a system. The system may include at least one data processor and at least one memory. The at least one memory may store instructions that result in operations when executed by the at least one data processor. The operations may include: generating a graphic user interface configured to receive one or more inputs for constructing, based at least on data stored in a database, a hierarchical measure; receiving, via the graphic user interface, a first indication to add, to the hierarchical measure, a first measure and a second measure; responding to the first indication by at least constructing the hierarchical measure to include, based at least on the first measure being added prior to the second measure, the first measure as a parent measure and the second measure as a child measure, a first value of the first measure corresponding to an aggregate of at least a second value of the second measure; and updating the graphic user interface to at least provide a visual representation of the hierarchical measure.

In some variations, one or more features disclosed herein including the following features may optionally be included in any feasible combination. The graphic user interface may be updated to display a waterfall chart. The waterfall chart may include a first column having a first dimension corresponding to the first value of the first measure. The waterfall chart may further include a second column having a second dimension corresponding to the second value of the second measure.

In some variations, a second indication to add and/or designate a third measure as an intermediate measure may be received via the graphic user interface. In response to the second indication, the hierarchical measure may be constructed to include the third measure as another child measure of the first measure. The second measure may remain the child measure of the first measure based at least on the third measure succeeding the second measure. The first value of the first measure may aggregate the second value of the second measure and a third value of the third measure. The second measure may become a child measure of the third measure based at least on the third measure preceding the second measure. The first value of the first measure may aggregate a third value of the third measure but not the second value of the second measure.

In some variations, a second indication to add a dimension to the hierarchical measure may be received via the graphic user interface. In response to the second indication, the first measure and the second measure may be divided into one or more sets of values corresponding to one or more root values associated with the dimension. The first measure and the second measure may be divided into a first set of values corresponding to a first root value of the dimension and a second set of values corresponding to a second root value of the dimension. The hierarchical measure may be expanded as a single hierarchy having additional nodes corresponding to the first set of values corresponding to the first root value of the dimension and the second set of values corresponding to the second root value of the dimension. The hierarchical measure may be expanded into a first hierarchy and a second hierarchy. The first hierarchy may correspond to the first set of values associated with the first root value of the dimension. The second hierarchy may correspond to the second set of values associated with the second root value of the dimension.

In some variations, a second indication to expand the first measure and/or the second measure may be received via the graphic user interface. In response to the second indication, the hierarchical measure may be expanded to include one or more additional child measures whose aggregate value correspond to the first value of the first measure and/or the second value of the second measure.

In some variations, the graphic user interface may include a first graphic control element configured to receive the first indication to add the first measure and/or the second measure. The graphic user interface may further include a second graphic control element configured receive a second indication to remove, from the hierarchical measure, the first measure and/or the second measure. The first graphic control element and/or the second graphic control element may include a button, a slider, a list box, a spinners, a drop-down list, a menu, a menu bar, a toolbar, an icons, and/or a text box.

In another aspect, there is provided a method for accessing hierarchical data stored in a database. The method may include: generating a graphic user interface configured to receive one or more inputs for constructing, based at least on data stored in a database, a hierarchical measure; receiving, via the graphic user interface, a first indication to add, to the hierarchical measure, a first measure and a second measure; responding to the first indication by at least constructing the hierarchical measure to include, based at least on the first measure being added prior to the second measure, the first measure as a parent measure and the second measure as a child measure, a first value of the first measure corresponding to an aggregate of at least a second value of the second measure; and updating the graphic user interface to at least provide a visual representation of the hierarchical measure.

In some variations, one or more features disclosed herein including the following features may optionally be included in any feasible combination. The graphic user interface may be updated to display a waterfall chart. The waterfall chart may include a first column having a first dimension corresponding to the first value of the first measure. The waterfall chart may further include a second column having a second dimension corresponding to the second value of the second measure.

In some variations, the method may further include: receiving, via the graphic user interface, a second indication to add and/or designate a third measure as an intermediate measure; and responding to the second indication by at least constructing the hierarchical measure to include the third measure as another child measure of the first measure. The second measure may remain the child measure of the first measure based at least on the third measure succeeding the second measure. The first value of the first measure may aggregate the second value of the second measure and a third value of the third measure. The second measure may become a child measure of the third measure based at least on the third measure preceding the second measure. The first value of the first measure may aggregate a third value of the third measure but not the second value of the second measure.

In some variations, the method may further include: receiving, via the graphic user interface, a second indication to expand the first measure and/or the second measure; and responding to the second indication by at least expanding the hierarchical measure to include one or more additional child measures whose aggregate value correspond to the first value of the first measure and/or the second value of the second measure.

In another aspect, there is provided a computer program product that includes a non-transitory computer readable storage medium. The non-transitory computer-readable storage medium may include program code that causes operations when executed by at least one data processor. The operations may include: generating a graphic user interface configured to receive one or more inputs for constructing, based at least on data stored in a database, a hierarchical measure; receiving, via the graphic user interface, a first indication to add, to the hierarchical measure, a first measure and a second measure; responding to the first indication by at least constructing the hierarchical measure to include, based at least on the first measure being added prior to the second measure, the first measure as a parent measure and the second measure as a child measure, a first value of the first measure corresponding to an aggregate of at least a second value of the second measure; and updating the graphic user interface to at least provide a visual representation of the hierarchical measure.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a graphic user interface for accessing hierarchical data stored in a database, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2B depicts an example of a waterfall chart, in accordance with some example embodiments;

When practical, similar reference numbers denote similar structures, features, or elements.

DETAILED DESCRIPTION

Data stored in a database may be accessed via a user interface. Some user interfaces may enable a client to access the data through graphical icons and/or visual indicators instead of and/or in addition to typed commands and/or text navigation. For example, a graphic user interface (GUI) may display charts, graphs, and/or diagrams to provide a visual representation of a select portion of the data from the database. In some example embodiments, an analytics engine may be configured to generate one or more user interfaces that enables the construction of a hierarchical measure. The hierarchical measure may include a parent measure whose value correspond to an aggregate of the individual values of one or more child measures. In order to provide a visual representation of the hierarchical measure, the analytics engine may generate a waterfall chart depicting a cumulative effect of each of the one or more child measures on the parent measure.

Figure 1:
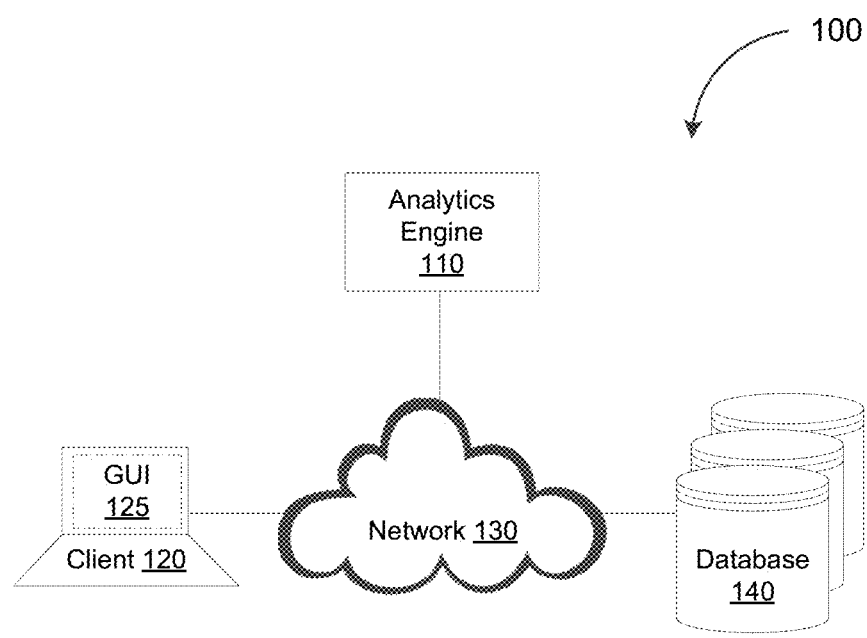
FIG. 1 depicts a system diagram illustrating an analytics system, in accordance with some example embodiments.

FIG. 1 depicts a system diagram illustrating an analytics system 100, in accordance with some example embodiments. Referring to FIG. 1, the analytics system 100 may include an analytics engine 110, a client 120, and a database 140. As shown in FIG. 1, the analytics engine 110, the client 120, and the database 140 may be communicatively coupled via a network 130. The network 130 may be any wired and/or wireless network including, for example, a wide area network (WAN), a local area network (LAN), a virtual local area network (VLAN), a public land mobile network (PLMN), the Internet, and/or the like.

In some example embodiments, the client 120 may interact with the analytics engine 110 in order to access data stored in the database 140. For example, the client 120 may send, to the analytics engine 110, a request construct, based on at least a portion of the data stored in the database 140, a hierarchical measure. The client 120 may further send, to the analytics engine 110, a request to generate a visual representation of the hierarchical measure. As shown in FIG. 1, the analytics engine 110 may generate a graphic user interface 125. The graphic user interface 125 may be configured to receive, at the client 120, inputs corresponding to the request to construct the hierarchical measure. Alternatively and/or additionally, the graphic user interface 125 may be configured to receive, at the client 120, inputs corresponding to the request to generate the visual representation of the hierarchical measure. The graphic user interface 125 may be further configured to display, at the client 120, the visual representation of the hierarchical measure.

Figure 2A:
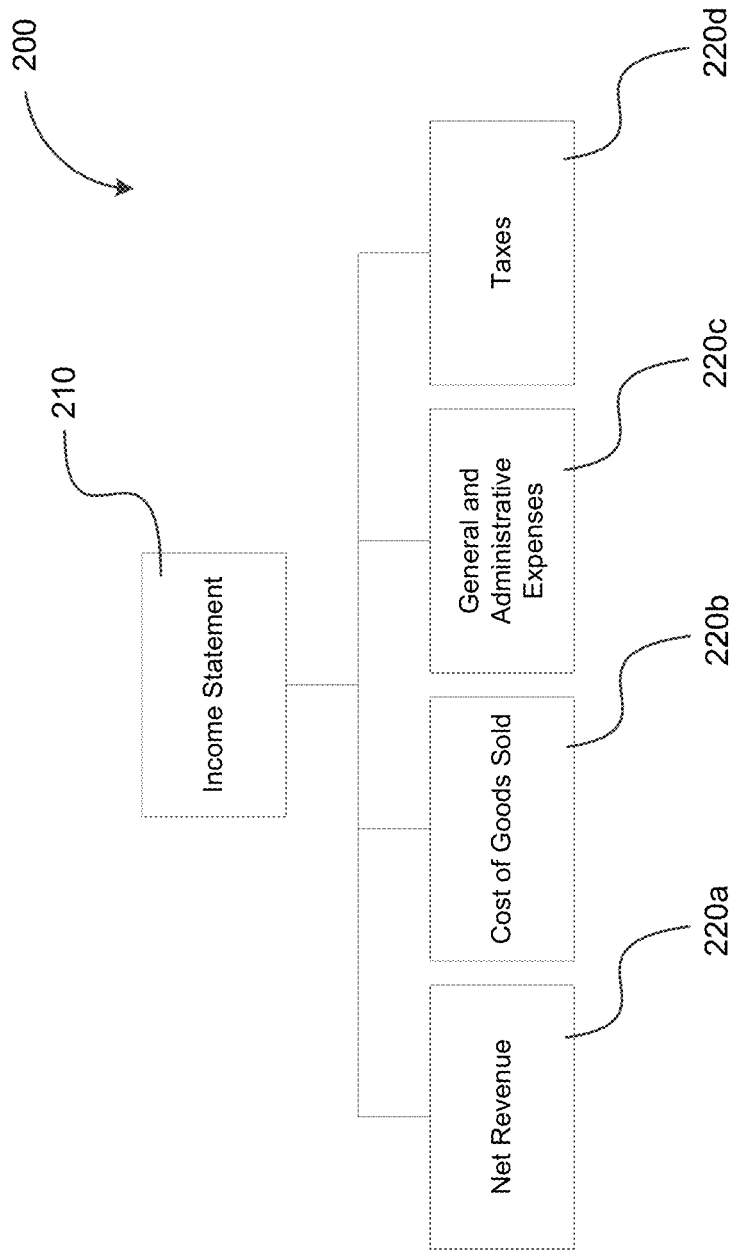
FIG. 2A depicts an example of a hierarchical measure, in accordance with some example embodiments.

As noted, a hierarchical measure may include a parent measure whose value correspond to an aggregate of the individual values of one or more child measures. The hierarchical measure may therefore correspond to a tree in which the parent measure forms a root node of the tree and the child measures form the leaf nodes of the tree. Meanwhile, the visual representation of the hierarchical measure may be a waterfall chart depicting a cumulative effect of each of the one or more child measures on the parent measure. To further illustrate, FIG. 2A depicts an example of a hierarchical measure 200, in accordance with some example embodiments. For instance, the hierarchical measure 200 may include a parent measure 210 whose value correspond to an aggregate of the individual values of a plurality of child measures including, for example, a first child measure 220a, a second child measure 220b, a third child measure 220c, and a fourth child measure 220d. In the example shown in FIG. 2A, the value of "Income Statement" may correspond to an aggregate of the individual values of "Net Revenue," "Cost of Goods Sold," "Taxes," and "General and Administrative Expenses."

FIG. 2B depicts an example of a waterfall chart 250, in accordance with some example embodiments. Referring to FIGS. 1 and 2A-B, the analytics engine 110 may generate the waterfall chart 250 as a visual representation of the hierarchical measure 200. In some example embodiments, the waterfall chart 250 may depict a cumulative effect that the individual values of the first child measure 220a, the second child measure 220b, the third child measure 220c, and the fourth child measure 220d may have on the parent measure 210. For example, the waterfall chart 250 may depict how the respective values of "Net Revenue," "Cost of Goods Sold," "Taxes," and "General and Administrative Expenses" may be aggregated to yield the value for "Income Statement." As shown in FIG. 2B, the waterfall chart 250 may include one or more bricks and/or columns whose relative dimensions and/or placement along a baseline axis may correspond to the respective values of "Net Revenue," "Cost of Goods Sold," "Taxes," and "General and Administrative Expenses" may be aggregated to yield the value for "Income Statement." In the example of the waterfall chart 250 shown in FIG. 2B, these bricks and/or columns may be oriented horizontally. However, it should be appreciated that the bricks and/or columns may have a different orientation than shown (e.g., vertical and/or the like).

In some example embodiments, the analytics engine 110 may generate the graphic user interface 125 to receive, from the client 120, one or more inputs for constructing a hierarchical measure such as, for example, the hierarchical measure 200. The one or more inputs for constructing a hierarchical measure may include indications to add individual measures to the hierarchical measure. It should be appreciated that the first measure added to the hierarchical measure may become the parent measure of the hierarchical measure while subsequent measures added to the hierarchical measure may become the child measures of the hierarchical measure.

Figure 2C:
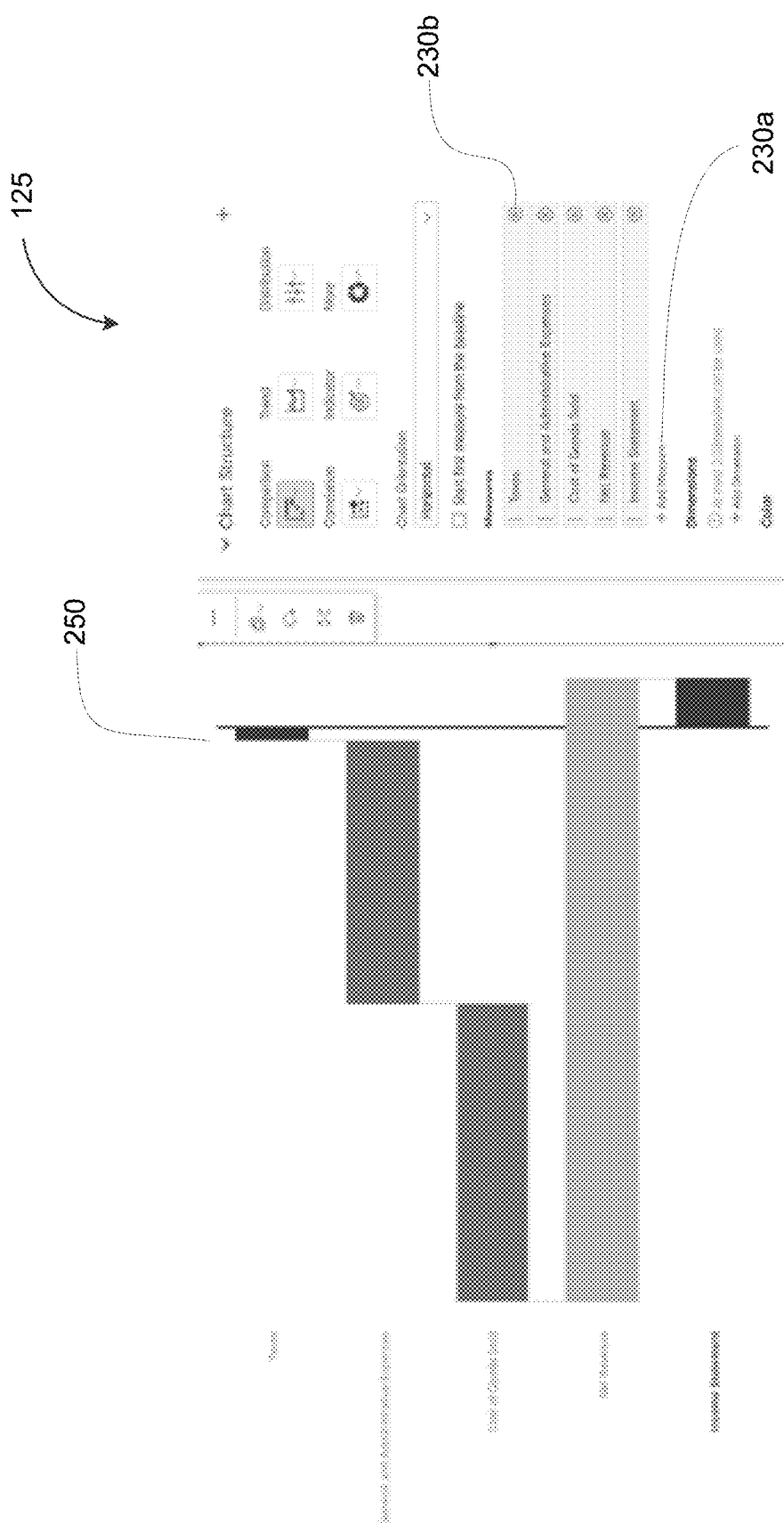
FIG. 2C depicts an example of a user interface, in accordance with some example embodiments.

For example, FIG. 2C depicts an example of the graphic user interface 125, in accordance with some example embodiments. In some example embodiments, the one or more inputs for constructing the hierarchical measure 200 may include indications to add and/or remove individual measures including, for example, the parent measure 210, the first child measure 220a, the second child measure 220b, the third child measure 220c, and the fourth child measure 220d. As shown in FIG. 2C, the graphic user interface 125 may include one or more graphic control elements that may be used for providing the indications to add and/or remove a measure from the hierarchical measure 200. For instance, the graphic user interface 125 may include a first graphic control element 230a for adding a measure from the hierarchical measure 200. Alternatively and/or additionally, the graphic user interface 125 may include a second graphic control element 230b for removing a measure to the hierarchical measure 200. Although the first graphic control element 230a and the second graphic control element 230b are shown as buttons, it should be appreciated that the first graphic control element 230a and the second graphic control element 230b may be any graphic control element including, for example, sliders, list boxes, spinners, drop-down lists, menus, menu bars, toolbars, icons, text boxes, and/or the like.

Figure 2D:
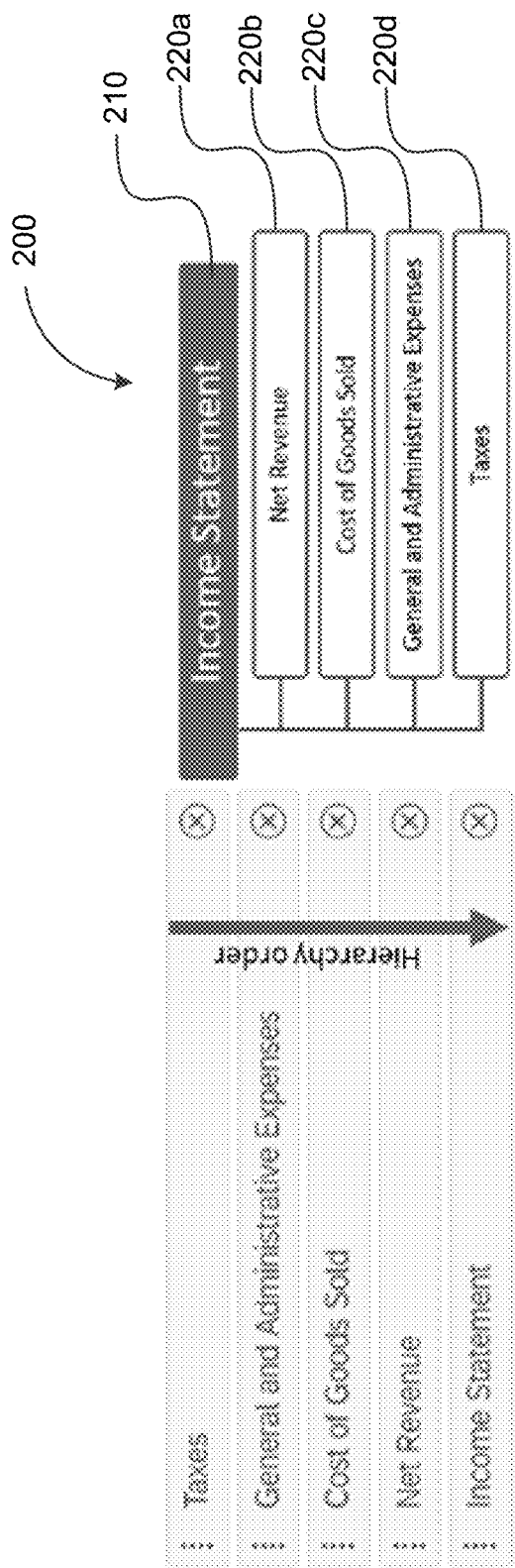
FIG. 2D depicts an order for constructing a hierarchical measure, in accordance with some example embodiments.

FIG. 2D depicts an order for constructing the hierarchical measure 200, in accordance with some example embodiments. As shown in FIG. 2D, the first measure added to the hierarchical measure 200, for example, using the first graphic control element 230a of the graphic user interface 125, may become the parent measure 210 of the hierarchical measure 200. Meanwhile, subsequent measures added to the hierarchical measure 200, for example, using the first graphic control element 230a, may become the child measures of the hierarchical measure 200 including, for example, the first child measure 220a, the second child measure 220b, the third child measure 220c, and the fourth child measure 220d.

In some example embodiments, the analytics engine 110 may generate the waterfall chart 250 to provide a visual representation of the hierarchical measure 200 constructed, for example, by adding and/or removing measures using the first graphic control element 230a and/or the second graphic control element 230b in the graphic user interface 125. For instance, as shown in FIG. 2C, the analytics engine 110 may update the graphic user interface 125 to display, at the client 120, the waterfall chart 250 corresponding to the hierarchical measure 200. As noted, the waterfall chart 250 may depict the cumulative effect that the individual values of the first child measure 220a, the second child measure 220b, the third child measure 220c, and the fourth child measure 220d may have on the parent measure 210. For example, the waterfall chart 250 may depict how the respective values of "Net Revenue," "Cost of Goods Sold," "Taxes," and "General and Administrative Expenses" may be aggregated to yield the value for "Income Statement."

In some example embodiments, in addition to a parent measure and one or more child measures, a hierarchical measure may be constructed to include one or more intermediate measures. For instance, a measure may be added to the hierarchical measure as an intermediate measure. Alternatively and/or additionally, an existing child measure of the hierarchical measure may be designated as an intermediate measure. While the intermediate measure as well as measures between the intermediate measure and the parent measure may remain child measures of the parent measure, measures that are subsequent to the intermediate measure may be designated as the child measures of the intermediate measure instead of the parent measure. Accordingly, the value of the intermediate measure may correspond to an aggregate of the individual values of the child measures of the intermediate measure. Moreover, the value of the parent measure may correspond to an aggregate of the individual values of its child measures, which may include the intermediate measure as well as the child measures between the intermediate measure and the parent measure.

Figure 2E:
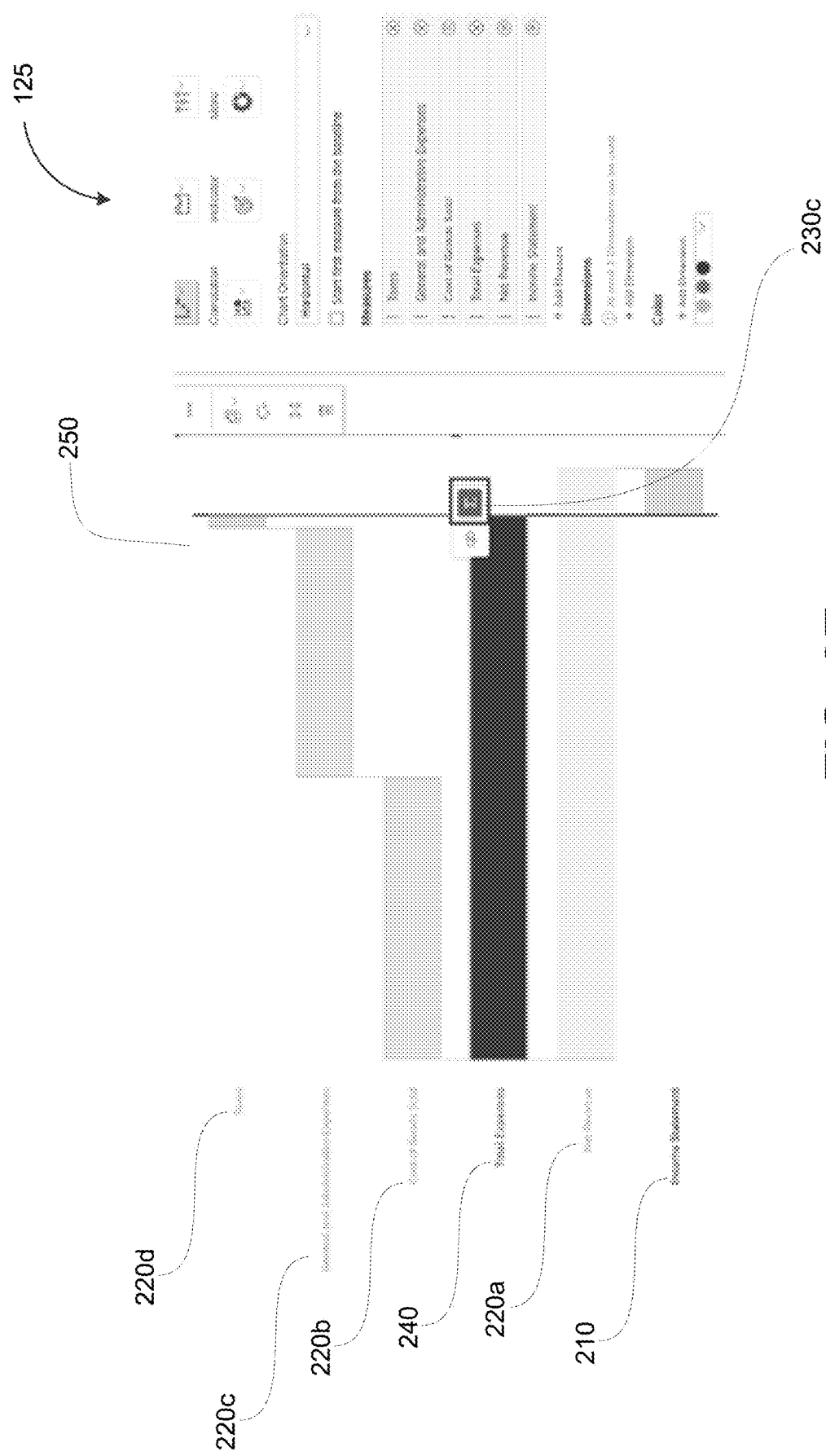
FIG. 2E depicts an example of a user interface, in accordance with some example embodiments.

To further illustrate, FIG. 2E depicts an example of the graphic user interface 125, in accordance with some example embodiments. Referring to FIG. 2E, the graphic user interface 125 may include a third graphic control element 230c, which may be used to add and/or designate a measure as an intermediate measure 240. By adding and/or designating the intermediate measure 240, the second child measure 220b, the third child measure 220c, and the fourth child measure 220d may become child measures of the intermediate measure 240 such that the value of the intermediate measure 240 correspond to an aggregate of the individual values of the second child measure 220b, the third child measure 220c, and the fourth child measure 220d. Meanwhile, the intermediate measure 240 and the first child measure 220a may be the child measures of the parent measure 210 such that the value of the parent measure 210 corresponds to an aggregate of the respective values of the intermediate measure 240 and the first child measure 220a.

Figure 2F:
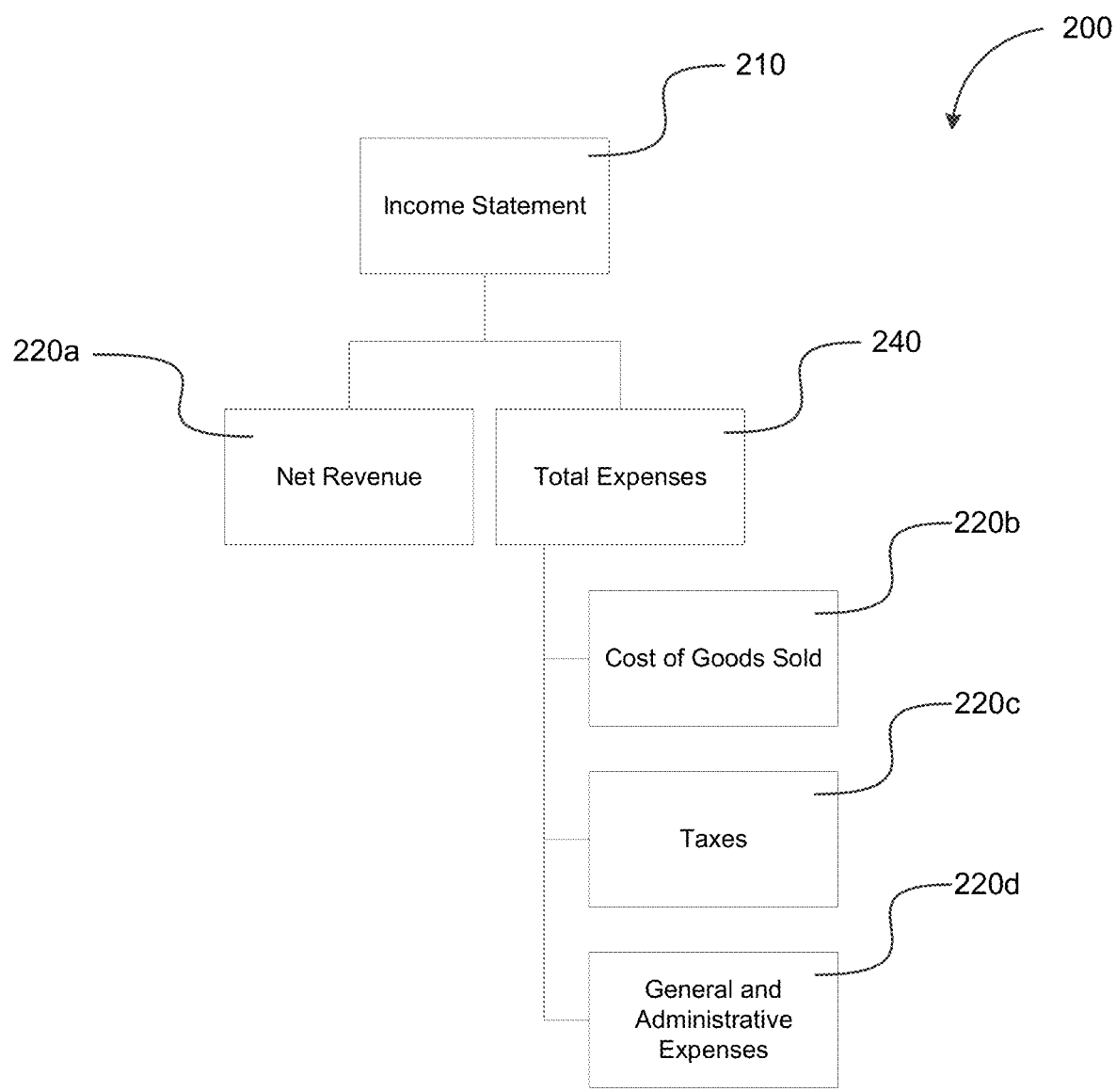
FIG. 2F depicts an example of a hierarchical measure having an intermediate measure, in accordance with some example embodiments.

FIG. 2F depicts an example of the resulting hierarchical measure 200 having the added intermediate measure 240, in accordance with some example embodiments. In response to the addition and/or designation of the intermediate measure 240, the analytics engine 110 may update the waterfall chart 250 to include the intermediate measure 240. Referring again to FIG. 2F, the waterfall chart 250 may depict the cumulative effect of the individual values of the second child measure 220b, the third child measure 220c, and the fourth child measure 220d on the intermediate measure 240. The waterfall chart 250 may further depict the cumulative effect of the values of the intermediate measure 240 and the first child measure 220a on the parent measure 210. It should be appreciated that while the values of the second child measure 220b, the third child measure 220c, and the fourth child measure 220d may contribute once to the value of the intermediate measure 240, these same values do not contribute again to the value of the parent measure 210. Instead, the parent measure 210 may correspond to an aggregate of the respective values of the intermediate measure 240 and the first child measure 220a.

For example, as shown in FIG. 2E, "Total Expenses" may be introduced as the intermediate measure 240 such that the value of "Income Statements" corresponds to an aggregate of the values of "Net Revenue" and "Total Expenses." Meanwhile, the value of "Total Expenses" may correspond to an aggregate of the values of "Cost of Goods Sold," "General and Administrative Expenses," and "Taxes." That is, the value of "Total Expenses" may capture the respective values of "Cost of Goods Sold," "General and Administrative Expenses," and "Taxes" such that the overall value of "Income Statement" may correspond to a sum of the values of "Net Revenue" and "Total Expenses."

In some example embodiments, one or more dimensions may be introduced into a hierarchical measure. As noted, a hierarchical measure may include a parent measure and one or more child measures. Accordingly, the one or more dimensions may be applied to the parent measure as well as each of the child measures such that the values of the parent measure and child measures may be divided in accordance with the one or more dimensions. Each dimension that is introduced into the hierarchical measure may be associated with one or more root values. Thus, applying the one or more dimensions to the parent measure and the child measures of the hierarchical measure may divide the values of the parent measure and child measures in accordance with the root values of each of the one or more dimensions. For example, applying a dimension having two root values to the hierarchical measure may include dividing the values of the parent measure and the child measures into a first set of values for the first root value and a second set of values for the second root value.

Figure 3A:
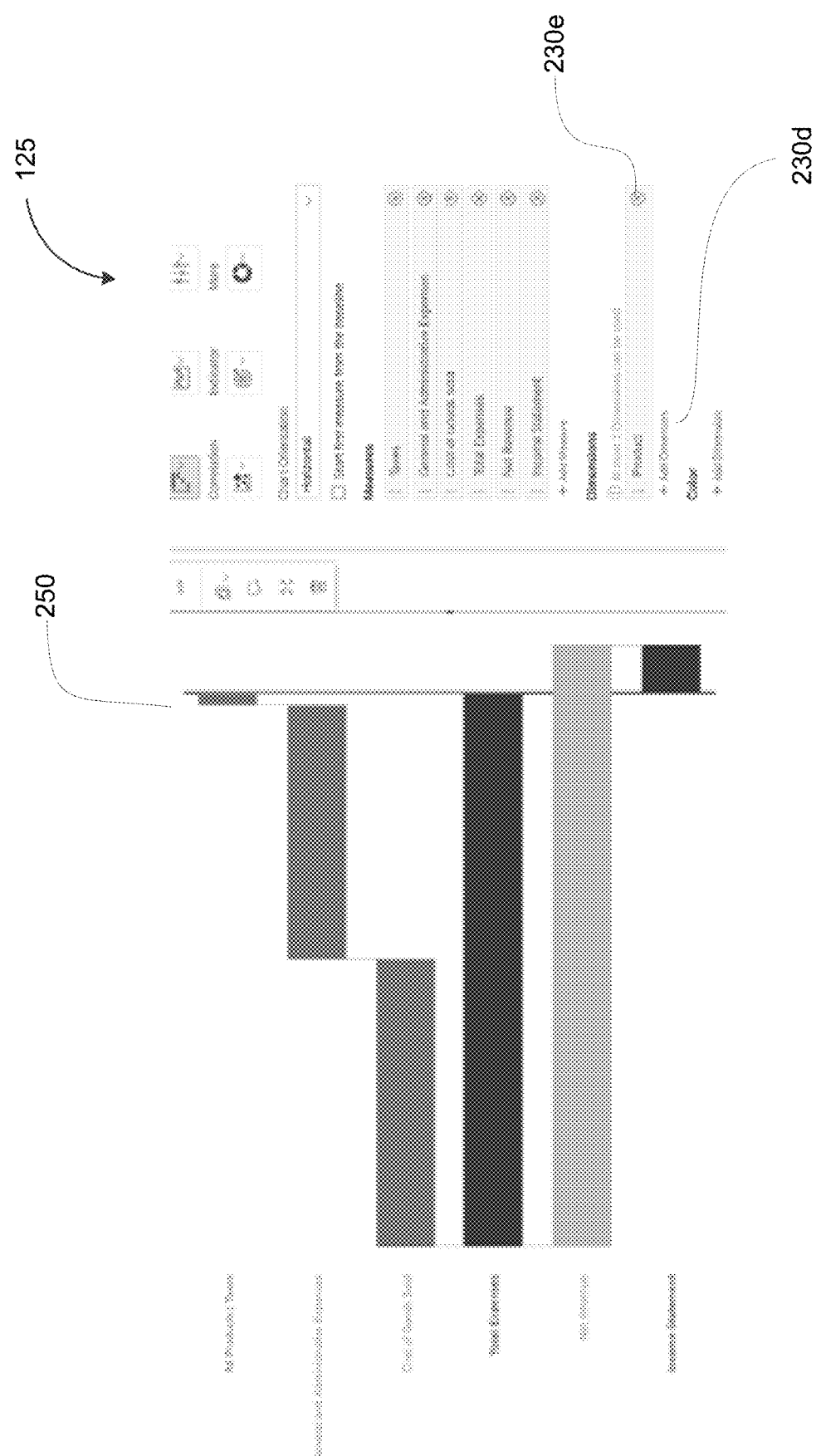
FIG. 3A depicts an example of a user interface, in accordance with some example embodiments.

To further illustrate, FIG. 3A depicts an example of the graphic user interface 125, in accordance with some example embodiments. Referring to FIG. 3A, the graphic user interface 125 may include a fourth graphic control element 230d for adding a dimension and a fifth graphic control element 230e for removing a dimension. In the example of the graphic user interface 125 shown in FIG. 3A, the dimension "Product" may be added to the hierarchical measure 200. As shown in FIG. 3A, the dimension "Product" may be associated with a single root value "All Product."

Figure 3B:
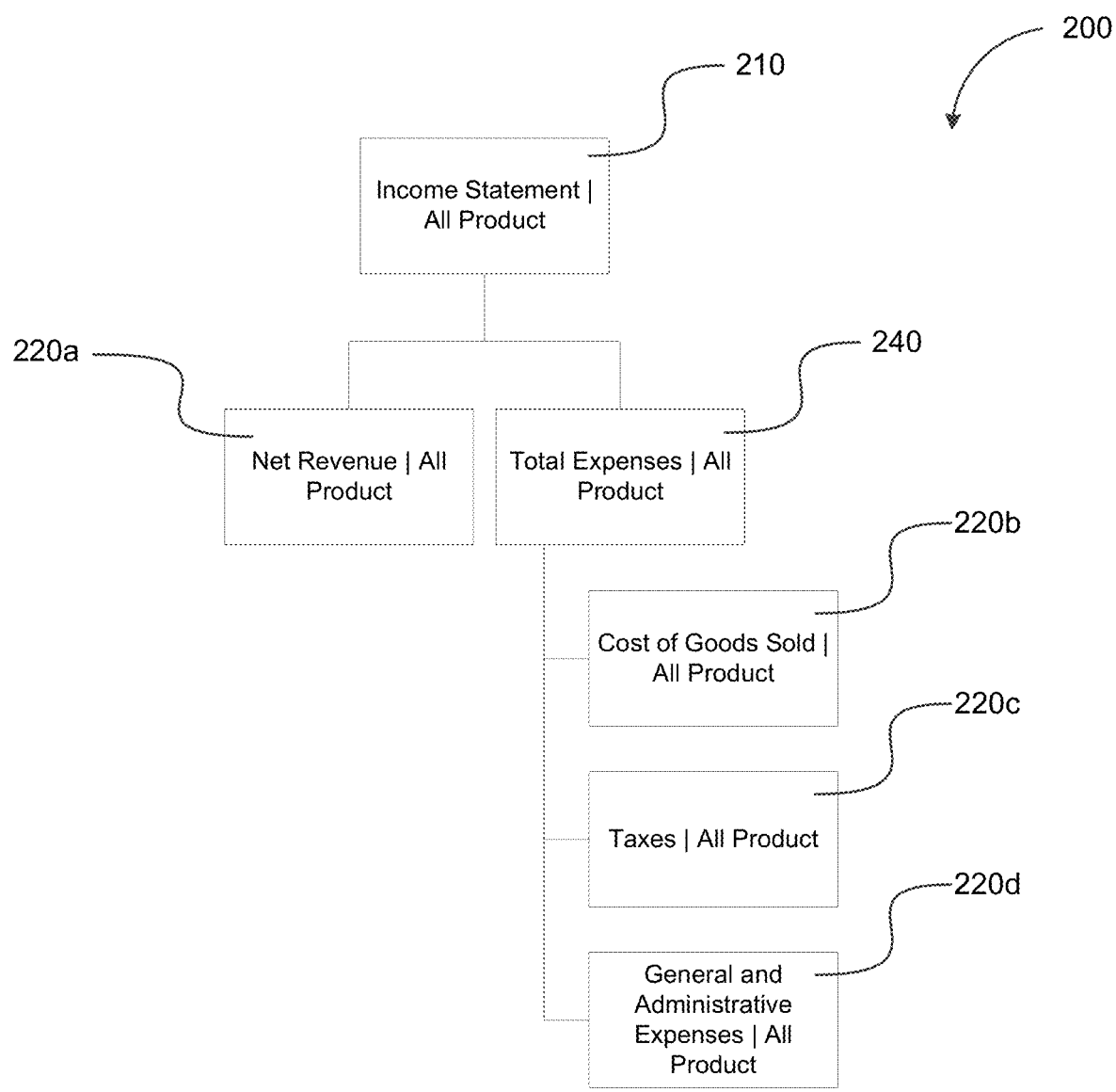
FIG. 3B depicts an example of a hierarchical measure, in accordance with some example embodiments.

Accordingly, the addition of the dimension "Product" may result in the hierarchical measure 200 shown in FIG. 3B in which the values of the parent measure 210, the first child measure 220a, the intermediate measure 240, the second child measure 220b, the third child measure 220c, and the fourth child measure 220d are shown as a single set of values for the root value "All Product." Moreover, as shown in FIG. 3B, the corresponding waterfall chart 250 that is displayed as part of the graphic user interface 125 may also show a single set of values for the root value "All Product." That is, the waterfall chart 250 shown in FIG. 3B may display a set of values for "Income Statement," "Net Revenue," "Total Expenses," "Cost of Goods Sold," "Taxes," and "General and Administrative Expenses" that is applicable to "All Products."

Figure 3C:
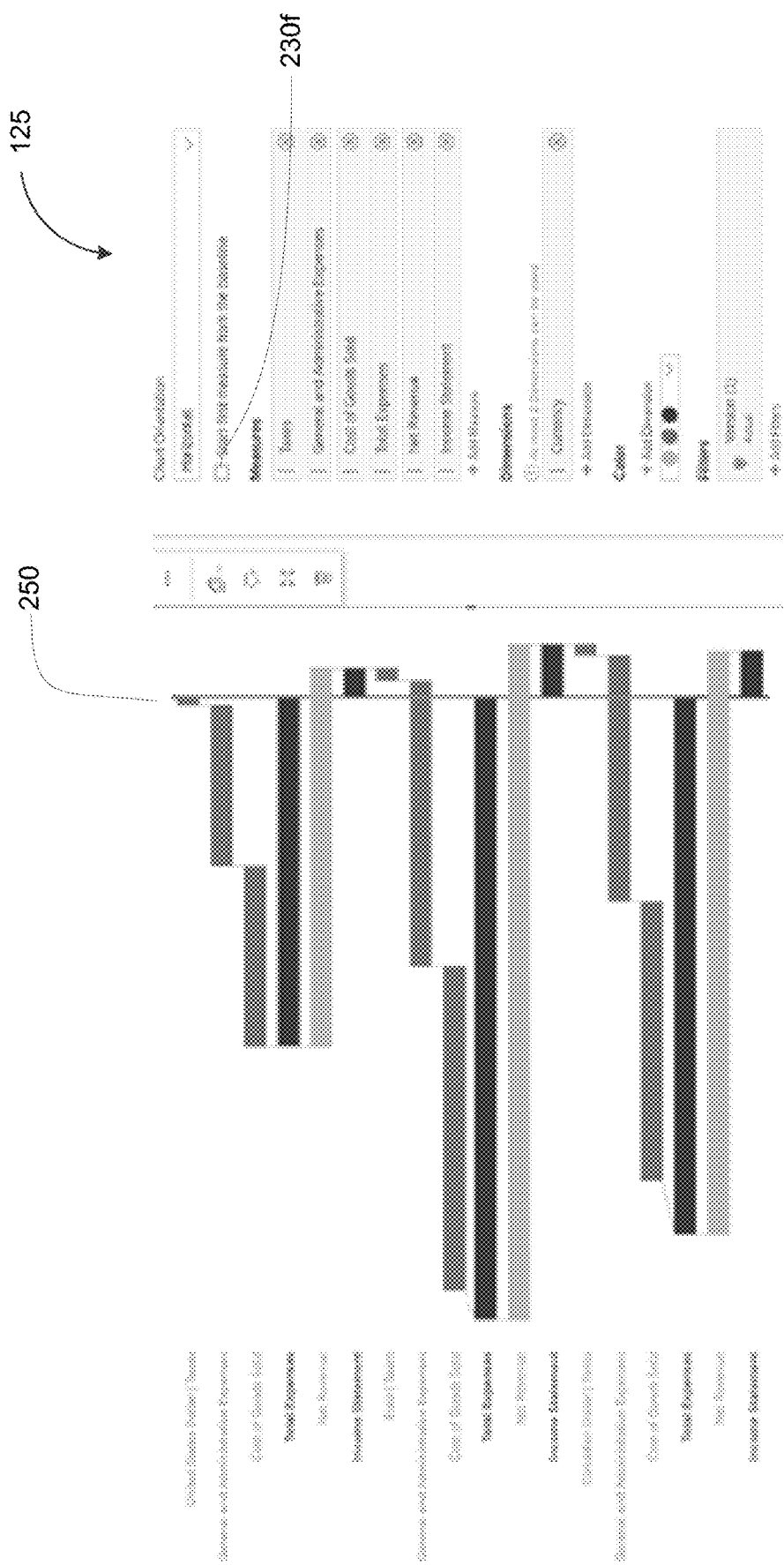
FIG. 3C depicts an example of a user interface, in accordance with some example embodiments.

By contrast, FIG. 3C depicts another example of the graphic user interface 125, in accordance with some example embodiments. As shown in FIG. 3C, a dimension "Currency" may be added to the hierarchical measure 200 instead of and/or in addition to the dimension "Product." The dimension "Currency" that is to the hierarchical measure 200 in the example shown in FIG. 3C may be associated with multiple root values including, for example, "Canadian Dollar," "Euro," and "United States Dollar." As such, the parent measure 210, the first child measure 220a, the intermediate measure 240, the second child measure 220b, the third child measure 220c, and the fourth child measure 220d may be divided in accordance with the root values "Canadian Dollar," "Euro," and "United States Dollar" to form the hierarchical measure 200 shown in FIG. 3D.

Figure 3D:
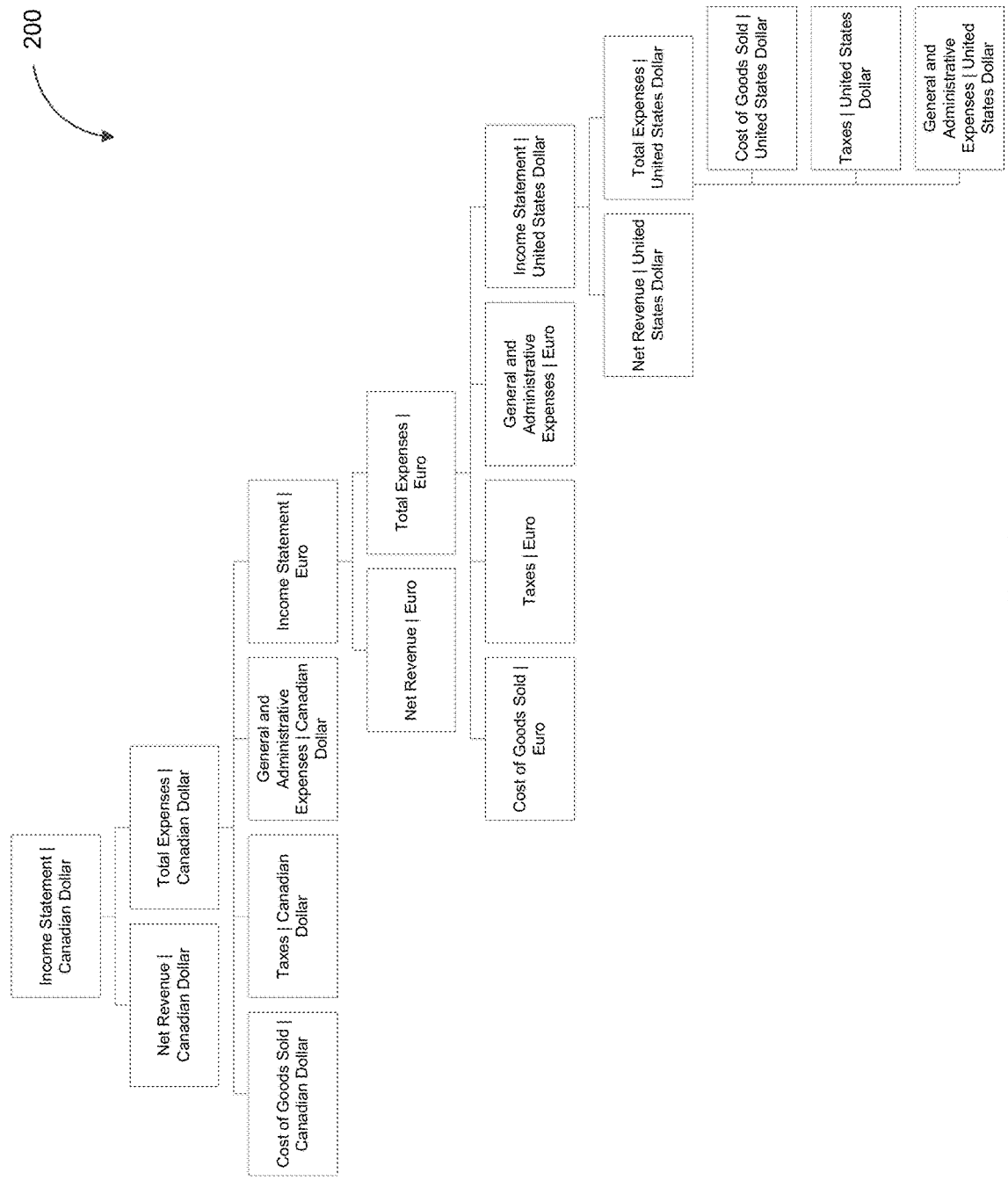
FIG. 3D depicts an example of a hierarchical measure, in accordance with some example embodiments.

As shown in FIG. 3D, when the dimension that is added to the hierarchical measure 200 is associated with multiple root values instead of a single root value, each of the parent measure 210, the first child measure 220a, the intermediate measure 240, the second child measure 220b, the third child measure 220c, and the fourth child measure 220d may be divided to form three separate sets of values corresponding to the root values "Canadian Dollar," "Euro," and "United States Dollar." For example, the value of the parent measure "Income Statement" may be divided into a first value for "Net Revenue" in "Canadian Dollars," a second value for "Net Revenue" in "Euro," and a third value for "Net Revenue" in "United States Dollar." Alternatively and/or additionally, the value of the child measure "Net Revenue" may also be divided into a first value for "Net Revenue" in "Canadian Dollars," a second value for "Net Revenue" in "Euro," and a third value for "Net Revenue" in "United States Dollar."

Moreover, as shown in FIG. 3C, the corresponding waterfall chart 250 that is displayed as part of the graphic user interface 125 may include three separate sets of values for the values of the parent measure 210, the first child measure 220a, the intermediate measure 240, the second child measure 220b, the third child measure 220c, and the fourth child measure 220d, each of the parent measure 210, the first child measure 220a, the intermediate measure 240, the second child measure 220b, the third child measure 220c, and the fourth child measure 220d that correspond to each of the root values "Canadian Dollar," "Euro," and "United States Dollar."

In some example embodiments, the addition of a dimension having multiple root values may generate a single hierarchy that includes every root value associated with the dimension. For example, the hierarchical measure 200 may be expanded to include a separate node for the "Canadian Dollar" value, the "Euro" value, and the "United States Dollar" value of each of the parent measure 210, the first child measure 220a, the intermediate measure 240, the second child measure 220b, the third child measure 220c, and the fourth child measure 220d. While the expansion of a hierarchical measure into a single hierarchy with additional nodes may be suitable for the addition of some dimensions, other dimensions may require the hierarchical measure to be expanded into multiple hierarchies.

Figure 3E:
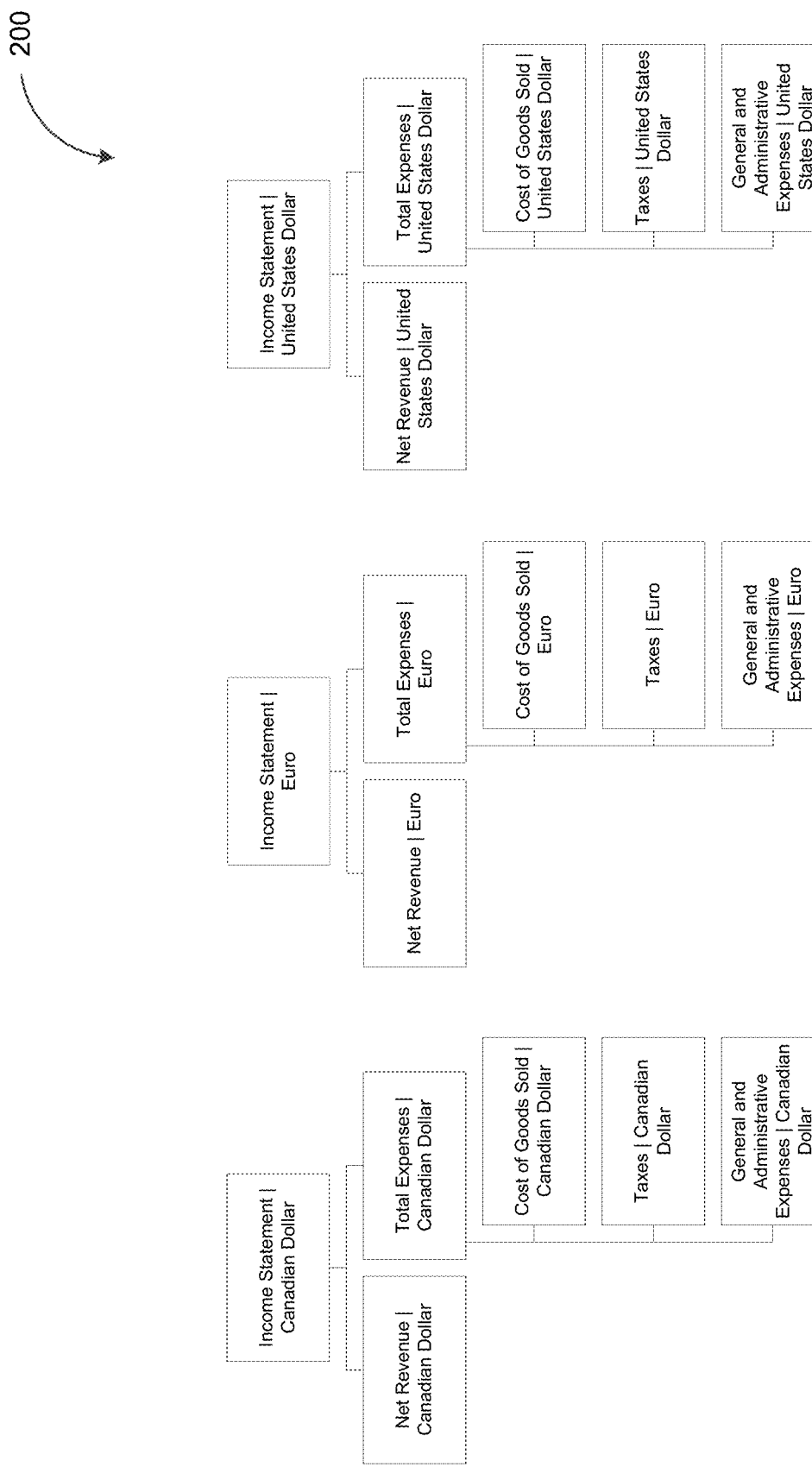
FIG. 3E depicts an example of a hierarchical measure, in accordance with some example embodiments.

To further illustrate, FIG. 3E depicts an example of the hierarchical measure 200, which may be expanded into multiple hierarchies in response to the addition of a dimension having multiple root values such as, for example, the dimension "Currency." Referring to FIGS. 3D-E, instead of a single hierarchy having additional nodes for the "Canadian Dollar" value, the "Euro" value, and the "United States Dollar" value of each of the parent measure 210, the first child measure 220a, the intermediate measure 240, the second child measure 220b, the third child measure 220c, and the fourth child measure 220d, the hierarchical measure 200 may be expanded into a first hierarchy corresponding to the root value "Canadian Dollar," a second hierarchy corresponding to the root value "Euro," and a third hierarchy corresponding to the root value "United States Dollar."

Without expanding the hierarchical measure 200 into a separate hierarchy for each currency, the single hierarchy shown in FIG. 3D may include an intermediate measure for one currency whose child measures include the parent measure of another currency. For example, FIG. 3D shows that one of the child measures of the intermediate measure "Total Expenses Canadian Dollars" is the parent measure "Income Statement Euro." Accordingly, the intermediate measure "Total Expenses Canadian Dollar" may conflate values from the parent measure "Income Statement Euro," which may further conflate values from the parent measure "Income Statement United States Dollar." These inconsistencies may be avoided by expanding the hierarchical measure 200 into multiple hierarchies, each of which having a separate parent measure.

Accordingly, the nodes of the first hierarchy may correspond to the "Canadian Dollar" values of the parent measure 210, the first child measure 220a, the intermediate measure 240, the second child measure 220b, the third child measure 220c, and the fourth child measure 220d. The nodes of the second hierarchy may correspond to the "Euro" values of the parent measure 210, the first child measure 220a, the intermediate measure 240, the second child measure 220b, the third child measure 220c, and the fourth child measure 220d. Alternatively and/or additionally, the nodes of the third hierarchy may correspond to the "United States Dollar" values of the parent measure 210, the first child measure 220a, the intermediate measure 240, the second child measure 220b, the third child measure 220c, and the fourth child measure 220d.

Referring again to FIG. 3C, in some example embodiments, the graphic user interface 125 may include a sixth graphic control element 230f, which may be used for providing an indication to expand a hierarchical measure into a single hierarchy or multiple hierarchies. For instance, as shown in FIG. 3C, the sixth graphic control element 230f may be a checkbox configured to receive, from the client 120, an input indicating that the hierarchical measure 200 should be expanded into multiple hierarchies in response to the addition of a dimension having multiple root values such as, for example, the dimension "Currency." Expanding the hierarchical measure 200 into multiple hierarchies may be suitable when the root values of the added dimension are independent.

For example, to enable a proper comparison between the "Canadian Dollar" values, the "Euro" values, and the "United States Dollar" values of the hierarchical measure 200, the "Euro" values and the "United States Dollar" values of the hierarchical measure 200 should not contribute to the "Canadian Dollar" values of the hierarchical measure 200. However, the "Euro" values and the "United States Dollar" values of the hierarchical measure 200 may contribute to the "Canadian Dollar" values of the hierarchical measure 200 if the hierarchical measure 200 is expanded into the single hierarchy shown in FIG. 3D. In order to separate the "Canadian Dollar" values, the "Euro" values, and the "United States Dollar" values of the hierarchical measure 200, the hierarchical measure 200 may be expanded into the multiple hierarchies shown in FIG. 3E. By expanding the hierarchical measure 200 into separate hierarchies, the visual representation of the "Canadian Dollar" values, the "Euro" values, and the "United States Dollar" values of the hierarchical measure 200 shown in the corresponding waterfall chart 250 may be associated with a same baseline, thereby enabling a proper comparison between the "Canadian Dollar" values, the "Euro" values, and the "United States Dollar" values of the hierarchical measure 200.

Figure 3F:
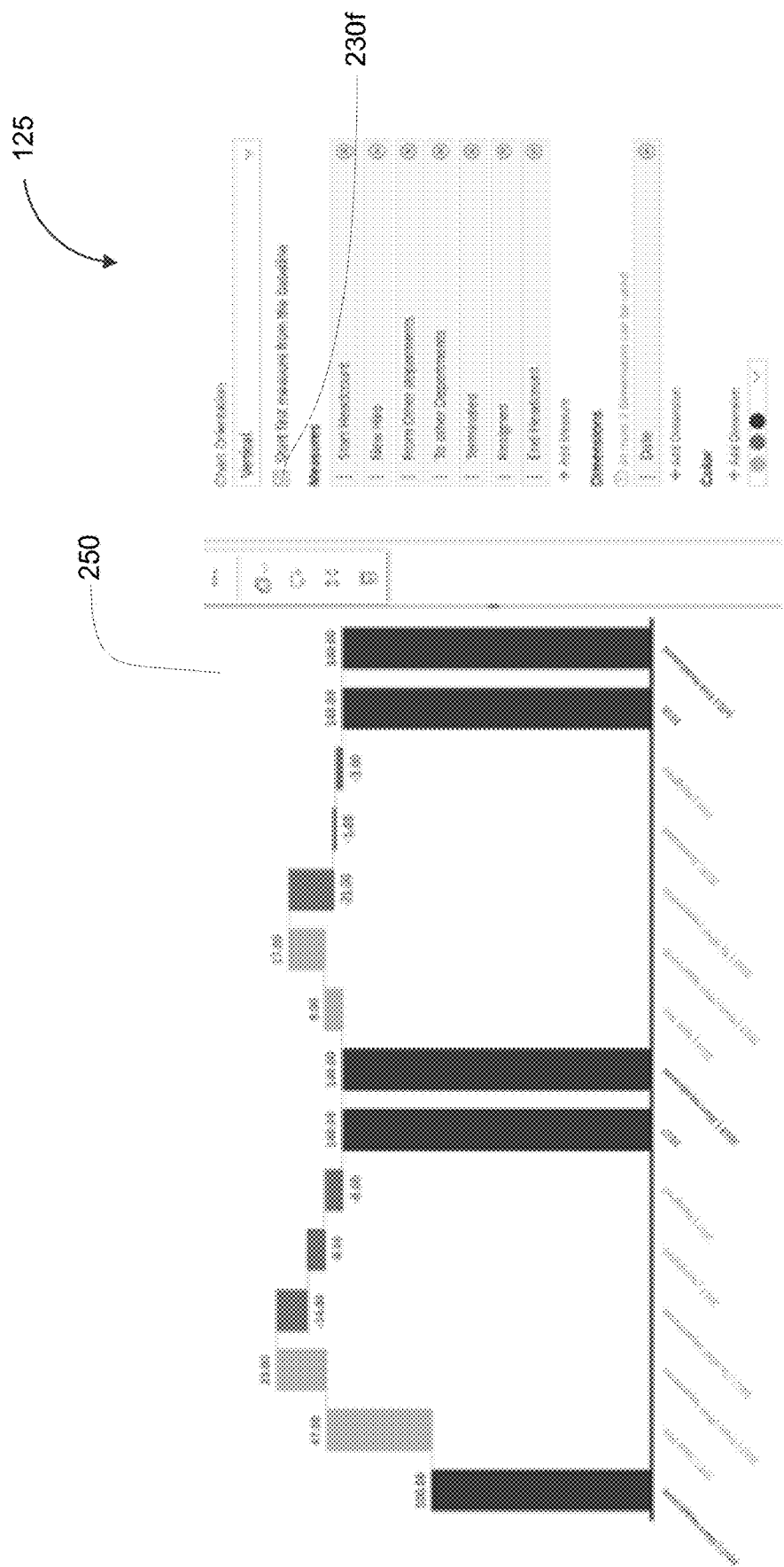
FIG. 3F depicts an example of a user interface, in accordance with some example embodiments.

FIG. 3F depicts another example of the graphic user interface 125, in accordance with some example embodiments. In the example shown in FIG. 3E, the sixth graphic control element 230f may be selected such that the value of the last child measure associated with a preceding root value is carried over as the value of the parent measure associated with a subsequent parent measure. For instance, by selecting the sixth graphic control element 230f, the value of the child measure "End Headcount" for the root value "2017" of the dimension "Date" may be carried over as the value of the parent measure "Start Headcount" for the root value "2018" of the dimension "Date."

In some example embodiments, the analytics engine 110 may support the expansion of any sum node into one or more constituent nodes. It should be appreciated that a sum node may correspond to a measure whose value corresponds to an aggregate of one or more additional measures. It should be appreciated that any measure including, for example, parent measures, intermediate measures, and child measures, may be expanded if that measure is an aggregate of one or more additional measures.

Figure 3G:
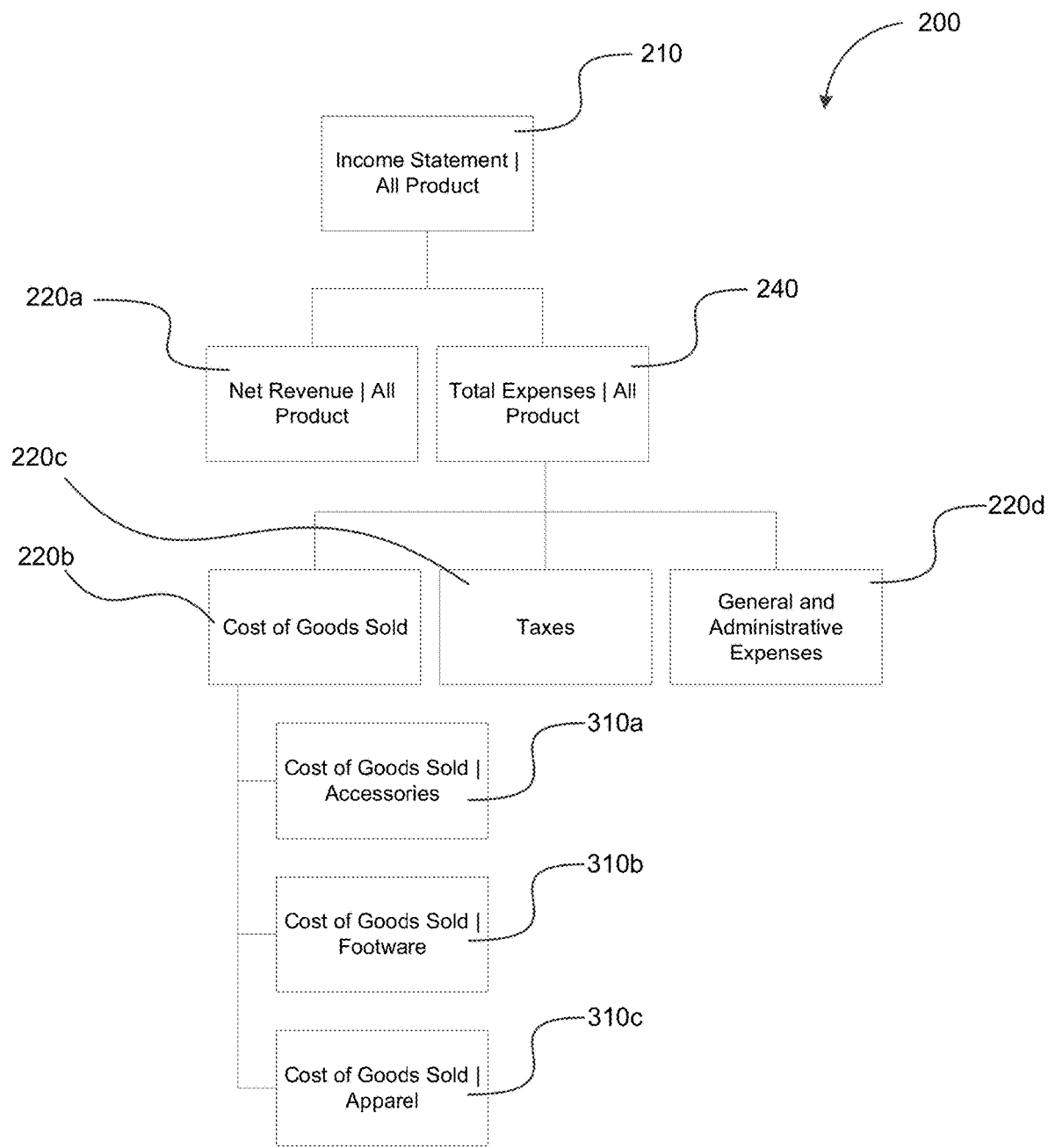
FIG. 3G depicts an example of an expanded sum node, in accordance with some example embodiments.

To further illustrate, FIG. 3G depicts an example of an expanded sum node, in accordance with some example embodiments. As shown in FIG. 3G, the second child measure 220b, which may descend from the intermediate measure 240, may correspond to a sum node. Accordingly, the second child measure 220b may be expanded into one or more additional child measures including, for example, a fifth child measure 310a, a sixth child measure 310b, and a seventh child measure 310c. The value of the second child measure 220b may correspond to an aggregate of the individual values of the fifth child measure 310a, the sixth child measure 310b, and the seventh child measure 310c. That is, the measure "Cost of Goods Sold," which itself may be a child measure of the intermediate measure "Total Expenses," may be expanded into additional child measures including, for example, "Cost of Goods Sold|Accessories," "Cost of Goods Sold|Footwear," and "Cost of Goods Sold|Apparel." The value of the measure "Cost of Goods Sold" may correspond to a sum of the respective values of the measures "Cost of Goods Sold|Accessories," "Cost of Goods Sold|Footwear," and "Cost of Goods Sold|Apparel."

Figure 3H:
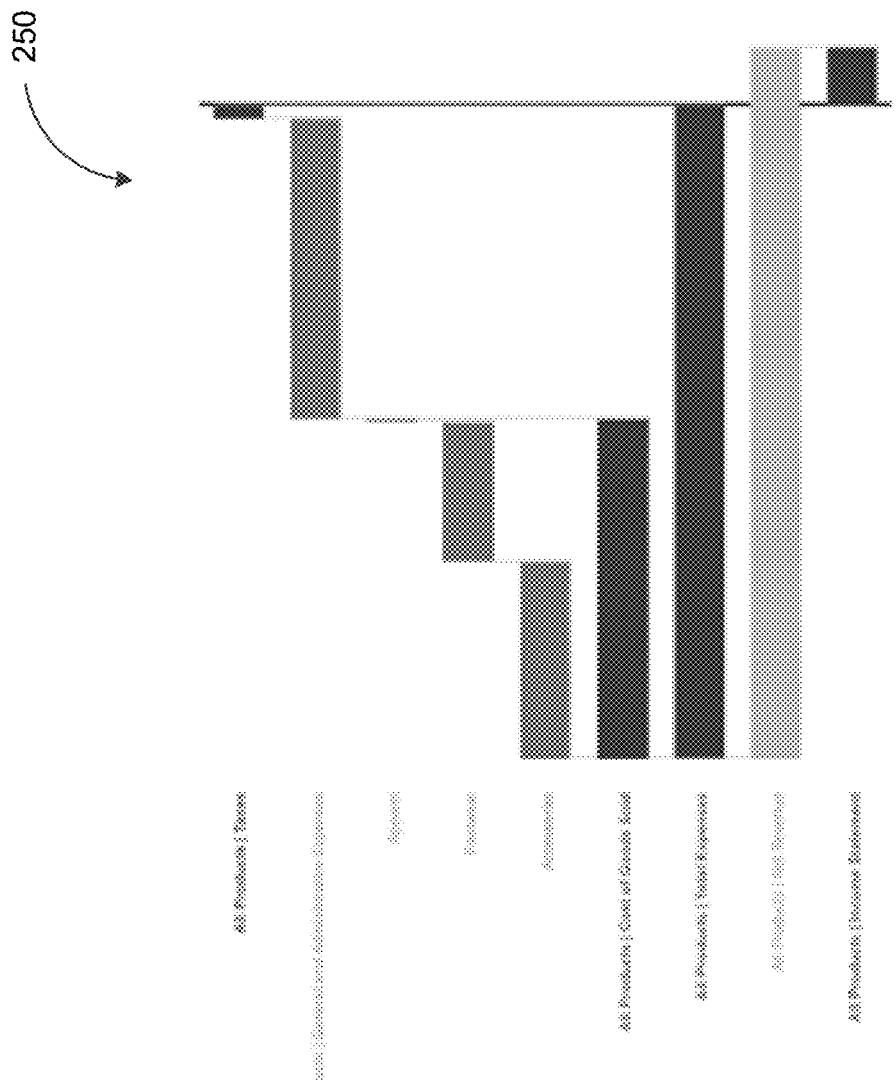
FIG. 3H depicts an example of a waterfall chart, in accordance with some example embodiments.

FIG. 3H depicts an example of the waterfall chart 250, in accordance with some example embodiments. Referring to FIGS. 3G-H, the waterfall chart 250 shown in FIG. 3H may correspond to the hierarchical measure 200 in which the second child measure 220b have been expanded into the fifth child measure 310a, the sixth child measure 310b, and the seventh child measure 310c. As shown in FIG. 3H, the waterfall chart 250 may depict the cumulative effects of the first child measure 220a and the intermediate measure 240 on the parent measure 210 as well as the cumulative effects of the second child measure 220b, the third child measure 220c, and the fourth child measure 220d on the intermediate measure 240. Moreover, by expanding the second child measure 220b, the waterfall chart 250 may also depict the cumulative effects of the fifth child measure 310a, the sixth child measure 310b, and the seventh child measure 310c on the second child measure 220b. For instance, the waterfall chart 250 may show how the respective values of the measures "Cost of Goods Sold|Accessories," "Cost of Goods Sold Footwear," and "Cost of Goods Sold|Apparel" may contribute to the overall value of the measure "Cost of Goods Sold."

Figure 3I:
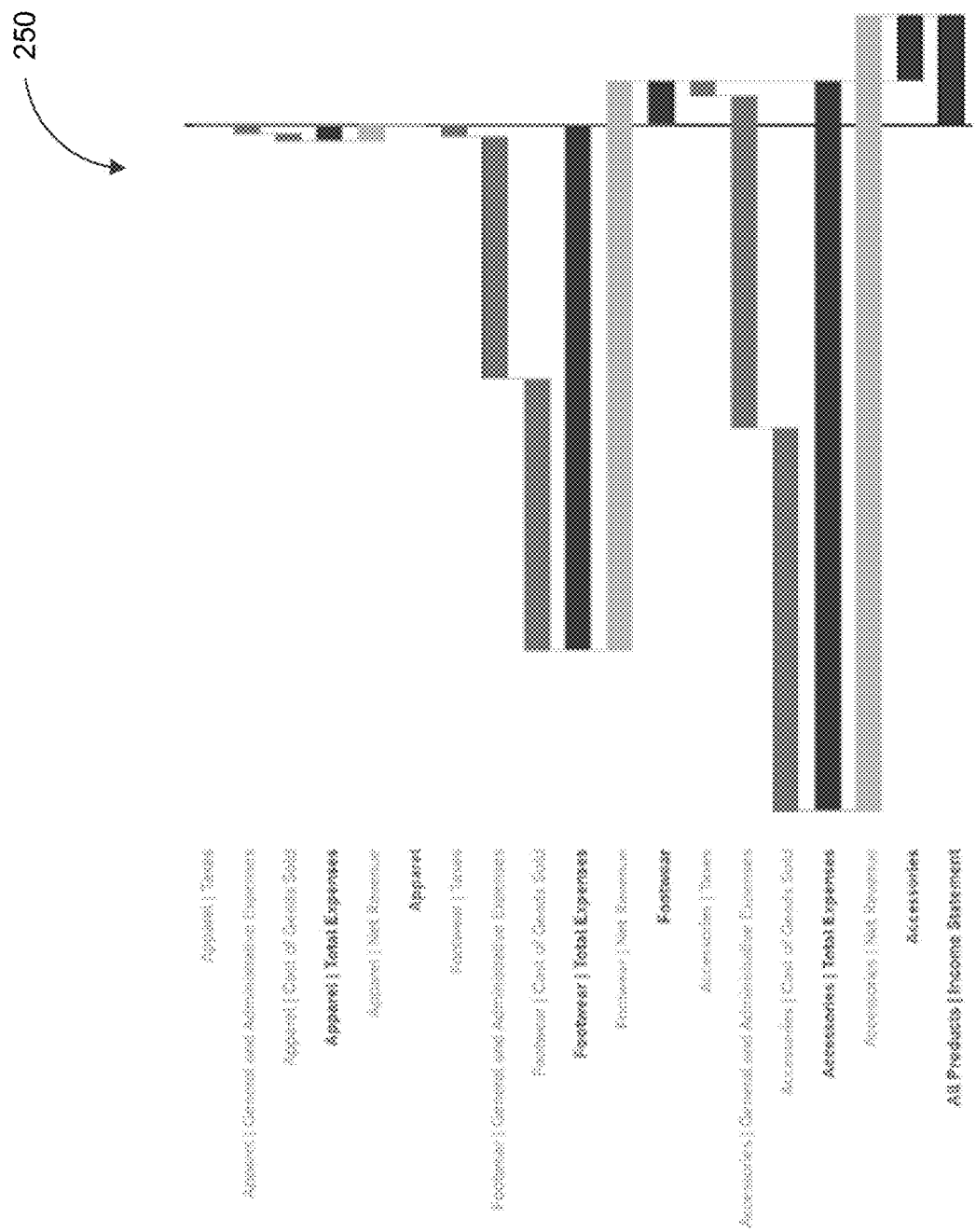
FIG. 3I depicts another example of a waterfall chart, in accordance with some example embodiments.

FIG. 3I depicts another example of the waterfall chart 250, in accordance with some example embodiments. In the example shown in FIG. 3I, the waterfall chart 250 may correspond to the hierarchical measure 200 in which the parent measure 210 have been expanded into a plurality of additional child measures. For example, as show in FIG. 3I, the parent measure "Income Statement" may be expanded into the child measures "Income Statement|Accessories," "Income Statement|Footwear," and "Income Statement|Apparel" such that the waterfall chart 250 depicts how the respective values of the measures "Income Statement|Accessories," "Income Statement|Footwear," and "Income Statement|Apparel" contribute to the overall value of the parent measure "Income Statement."

Figure 3J:
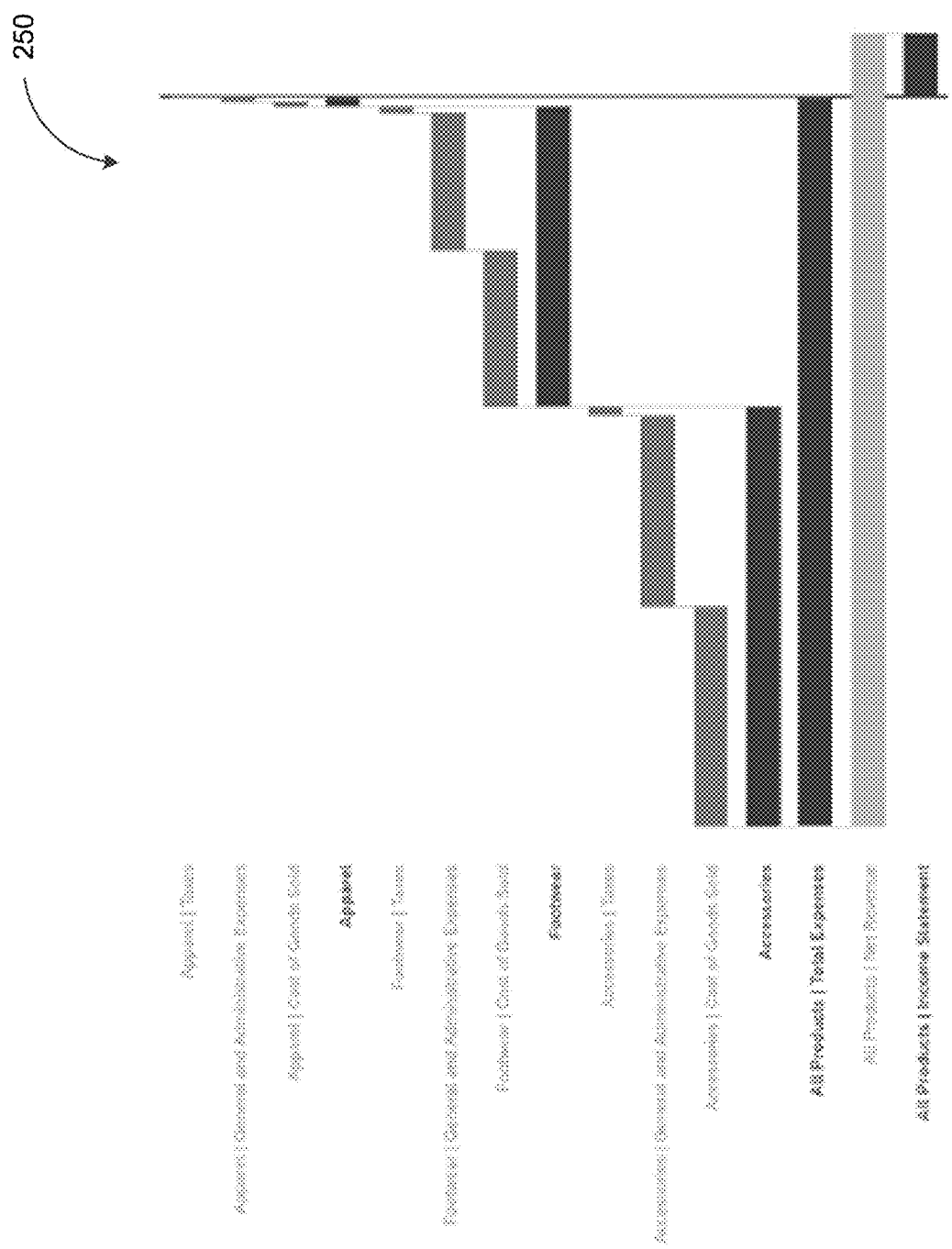
FIG. 3J depicts another example of a waterfall chart, in accordance with some example embodiments.

FIG. 3J depicts another example of the waterfall chart 250, in accordance with some example embodiments. In the example shown in FIG. 3J, the waterfall chart 250 may correspond to the hierarchical measure 200 in which the intermediate measure 240 have been expanded into a plurality of additional child measures. As shown in FIG. 3J, the intermediate measure "Total Expenses" may be expanded into additional child measures that further breaks down the value of "Total Expenses" in accordance with the categories "Accessories," "Footwear," and "Apparel." For instance, the child measure "Taxes" may be expanded into "Accessories|Taxes," "Footwear|Taxes," and "Apparel|Taxes." It should be appreciated that the example of the waterfall chart 250 shown in FIG. 3J may depict the cumulative effects of the measures "Taxes," "Costs of Goods Sold," and "General Administrative Expenses" on the value of the intermediate measure "Total Expenses" across different categories including, for example, "Accessories," "Footwear," and "Apparel." For example, the waterfall chart 250 may depict how the values of "Accessories|Taxes," "Accessories|General and Administrative Expenses," and "Accessories|Cost of Goods Sold" may contribute to the value of the measure "Total Expenses" for the "Accessories" category.

Figure 3K:
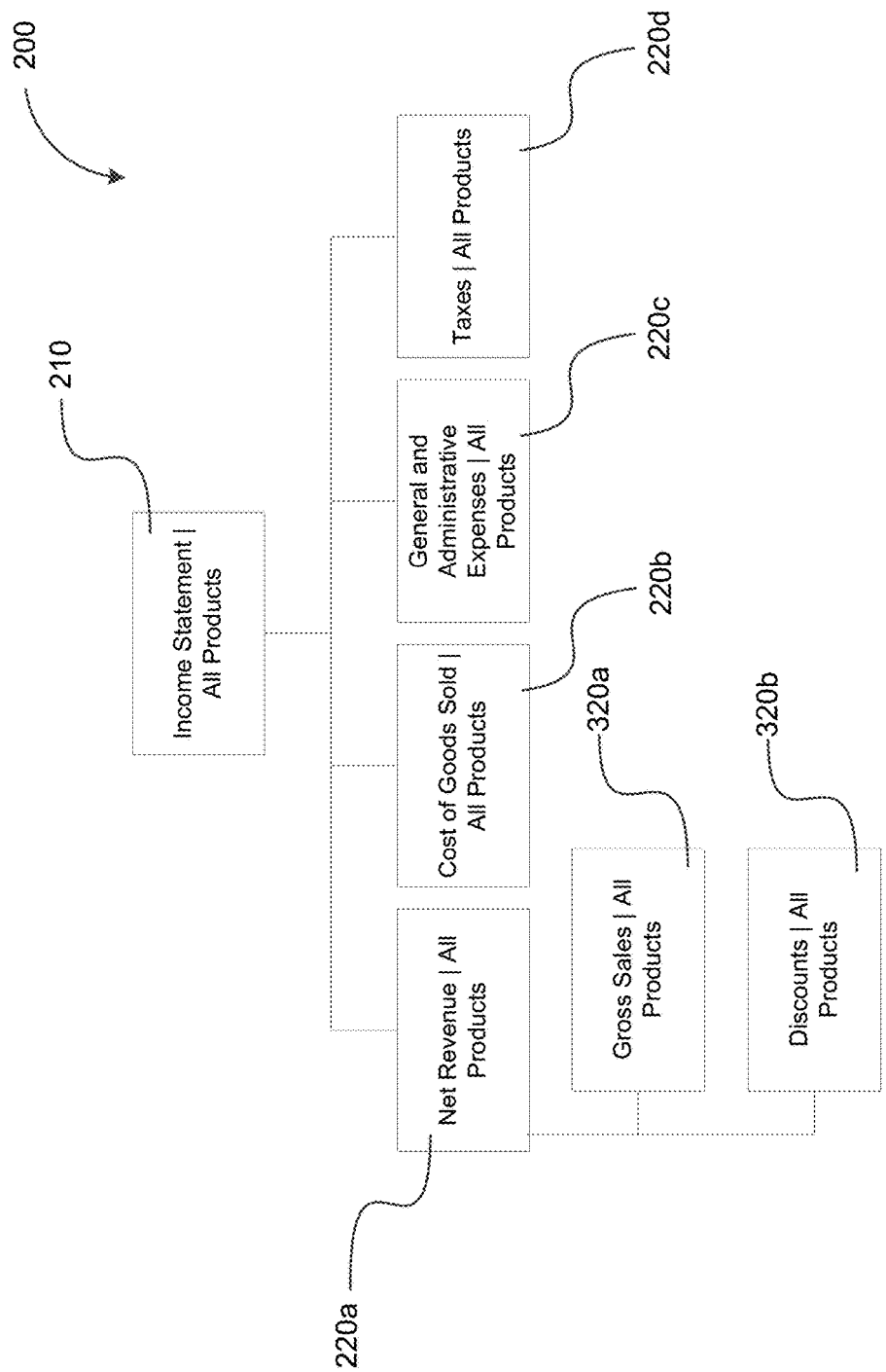
FIG. 3K depicts an example of a hierarchical measure, in accordance with some example embodiments.
Figure 3L:
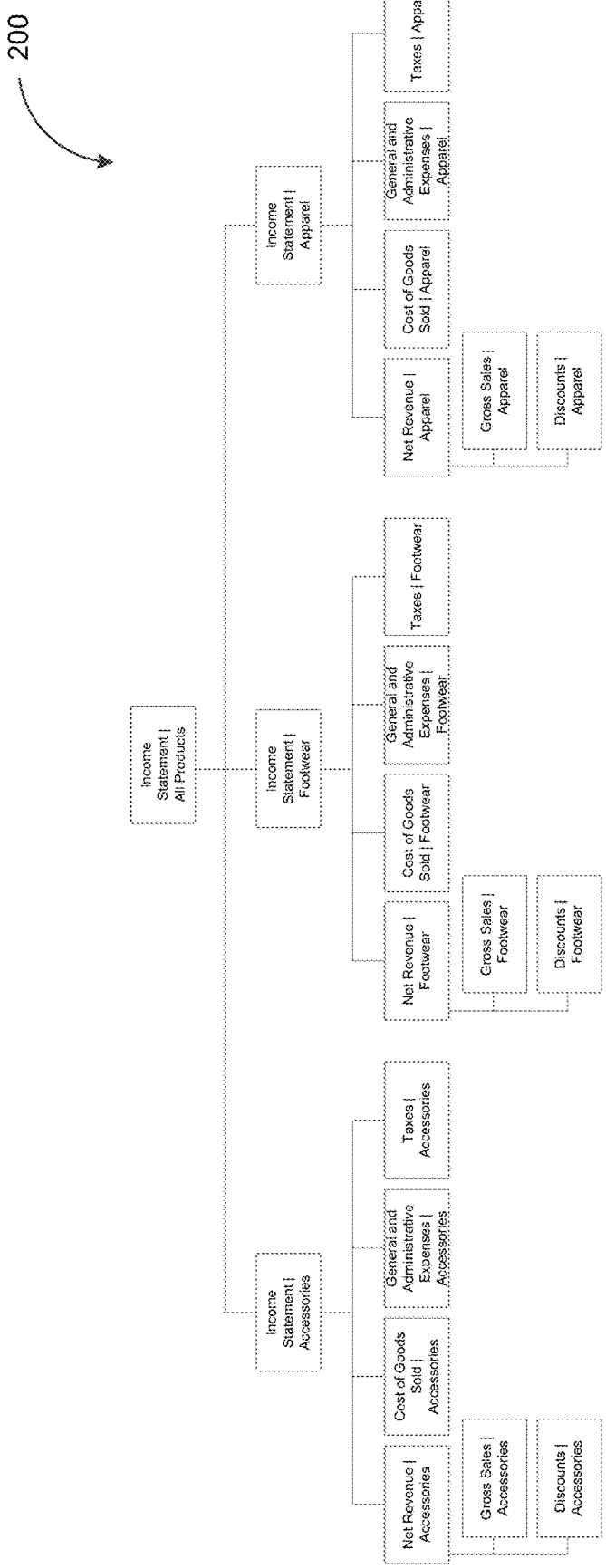
FIG. 3L depicts another example of a hierarchical measure, in accordance with some example embodiments.

In some example embodiments, the structure of child measures may be preserved when a corresponding parent measure is expanded, for example, across multiple dimensions. Moreover, the expansion of a child measure into additional child measures may also be preserved when the corresponding parent measure is expanded across multiple dimensions. To further illustrate, FIGS. 3K-L depict examples of the hierarchical measure 200, in accordance with some example embodiments. As FIG. 3K shows, the first child measure 220a may be further expanded into an eighth child measure 320a and a ninth child measure 320b. That is, the first child measure 220a may be expanded in order to show that the value of "Net Revenue" may correspond to a sum of the value of "Gross Sales" and "Discounts."

FIG. 3L depicts the hierarchical measure 200 shown in FIG. 3K being expanded across the dimension "Product." For example, while the hierarchical measure 200 shown in FIG. 3L depicts the values of the parent measure 210, the first child measure 220a, the second child measure 220b, the third child measure 220c, the fourth child measure 220d, the eighth child measure 320a, and the ninth child measure 320b across all dimensions, the hierarchical measure 200 shown in FIG. 3K has been expanded to break these measures down across the product categories "Accessories," "Footwear," and "Apparel."

As FIG. 3K shows, breaking the parent measure 210 down across the "Product" dimension may expand the hierarchical measure 200 in a manner that preserves the structure of the first child measure 220a, the second child measure 220b, the third child measure 220c, and the fourth child measure 220d. Moreover, the hierarchical measure 200 may be expanded in a manner that preserves the structure of the eighth child measure 320a and the ninth child measure 320b, which may be additional child measures that are added due to the expansion of the first child measure 220a. For example, FIG. 3K shows the structure of the first child measure 220a, the second child measure 220b, the third child measure 220c, the fourth child measure 220d, the eighth child measure 320a, and the ninth child measure 320b being replicated across each of the "Accessories" dimension, the "Footwear" dimension, and the "Apparel" dimension. Accordingly, it should be appreciated that expanding a parent measure across a dimension may not collapse and/or eliminate any of its child measures.

Figure 4:
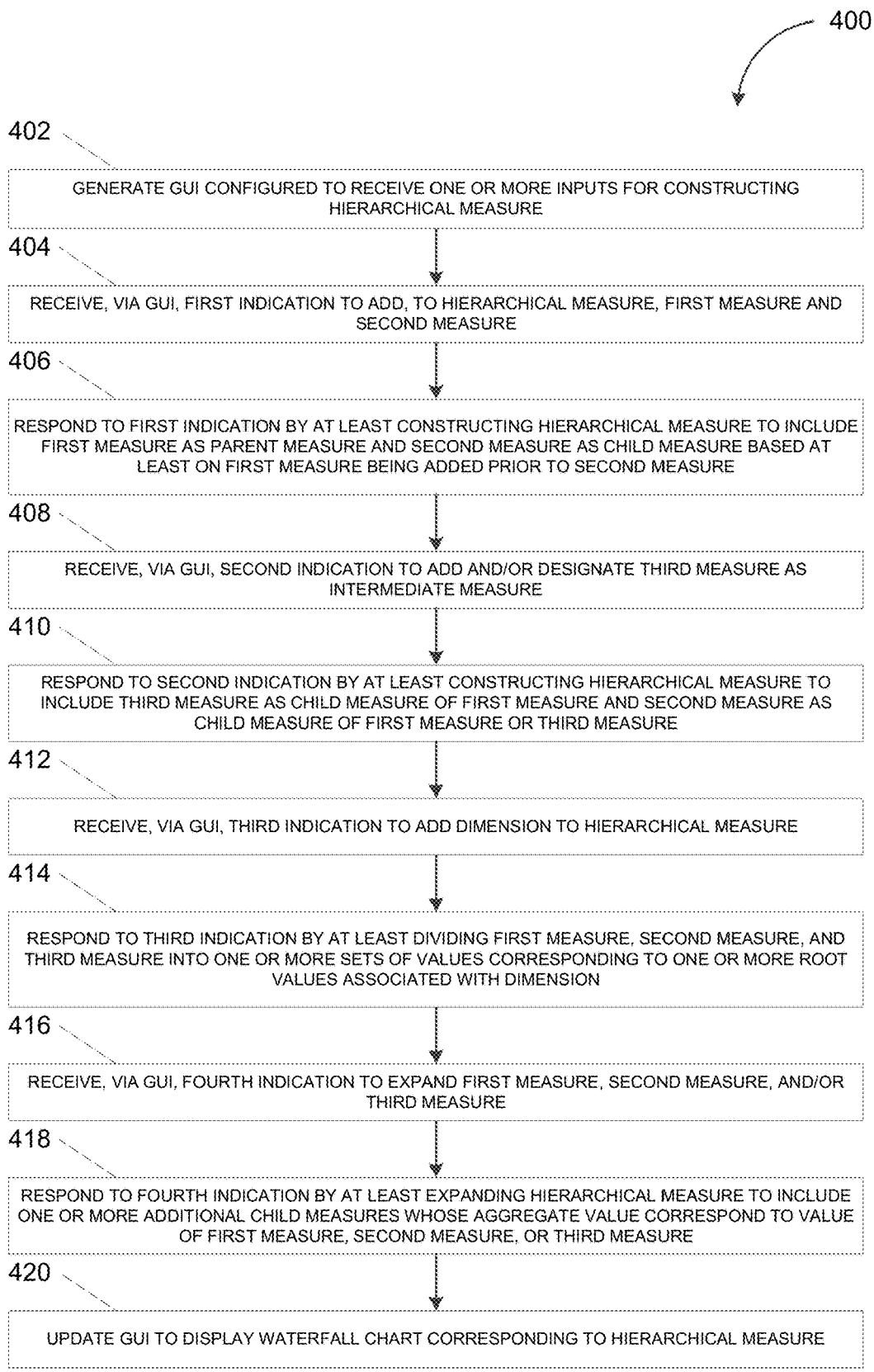
FIG. 4 depicts a flowchart illustrating a process for providing a visual representation of data stored in a database, in accordance with some example embodiments.

FIG. 4 depicts a flowchart illustrating a process 400 for providing a visual representation of data stored in a database system, in accordance with some example embodiments. Referring to FIGS. 1, 2A-F, 3A-L, and 4, the process 400 may be performed by the analytics engine 110 in order to provide, for example, a visual representation of at least a portion of data stored in the database 140.

At 402, the analytics engine 110 may generate a graphic user interface configured to receive one or more inputs for constructing a hierarchical measure. For example, the analytics engine 110 may generate the graphic user interface 125. The graphic user interface 125 may be configured to receive, from the client 120, one or more inputs for constructing a hierarchical measure such as, for example, the hierarchical measure 200.

At 404, the analytics engine 110 may receive, via the graphic user interface, a first indication to add, to the hierarchical measure, a first measure and a second measure. For example, the graphic user interface 125 may include the first graphic control element 230a for adding a measure to the hierarchical measure 200 and the second graphic control element 230b for removing a measure from the hierarchical measure 200. Accordingly, the analytics engine 110 may receive, via the graphic user interface 125, one or more inputs to add and/or remove measures from the hierarchical measure 200.

At 406, the analytics engine 110 may respond to the first indication by at least constructing the hierarchical measure to include the first measure as a parent measure and the second measure as a child measure based at least on the first measure being added prior to the second measure. In some example embodiments, the first measure that is added to the hierarchical measure 200 may become the parent measure 210 of the hierarchical measure 200 whereas the measures that are subsequently added to the hierarchical measure 200 may become child measures of the hierarchical measure 200 including, for example, the first child measure 220a, the second child measure 220b, the third child measure 220c, and the fourth child measure 220d. The value of the parent measure may correspond to an aggregate of the individual values of the child measures. For instance, the value of the parent measure 210 may correspond to an aggregate of the respective values of the first child measure 220a, the second child measure 220b, the third child measure 220c, and the fourth child measure 220d. Accordingly, as shown in FIG. 2A, the value of "Income Statement" may correspond to an aggregate of the individual values of "Net Revenue," "Cost of Goods Sold," "Taxes," and "General and Administrative Expenses."

At 408, the analytics engine 110 may receive, via the graphic user interface, a second indication to add and/or designate a third measure as an intermediate measure. For example, the graphic user interface 125 may include the third graphic control element 230c for adding and/or designating the intermediate measure 240.

At 410, the analytics engine 110 may respond to the second indication by at least constructing the hierarchical measure to include the third measure as a child measure of the first measure and the second measure as a child measure of the first measure or the third measure. For instance, as shown in FIGS. 2E-F, by adding and/or designating the intermediate measure 240, the second child measure 220b, the third child measure 220c, and the fourth child measure 220d may become child measures of the intermediate measure 240 while the intermediate measure 240 and the first child measure 220a may be the child measures of the parent measure 210. Accordingly, the value of the intermediate measure "Total Expenses" may correspond to an aggregate of the values of "Cost of Goods Sold," "Taxes," and "General and Administrative Expenses." Meanwhile, the value of the parent measure "Income Statement" may correspond to an aggregate of the respective values of "Net Revenue" and "Total Expenses."

At 412, the analytics engine 110 may receive, via the graphic user interface, a third indication to add a dimension to the hierarchical measure. As shown in FIG. 3A, the graphic user interface 125 may include the fourth graphic control element 230d for adding a dimension to the hierarchical measure 200 and the fifth graphic control element 230e for removing a dimension from the hierarchical measure 200.

At 414, the analytics engine 110 may respond to the third indication by at least dividing the first measure, the second measure, and third measure into one or more sets of values corresponding to one or more root values associated with the dimension. For example, the addition of a dimension having a single root value (e.g., the dimension "Product") to the hierarchical measure 200 may result in the parent measure 210, the first child measure 220a, the intermediate measure 240, the second child measure 220b, the third child measure 220c, and the fourth child measure 220d maintaining a single set of values associated with that root value (e.g., the root value "All Products"). Alternatively and/or additionally, the addition of a dimension having multiple root values (e.g., the dimension "Currency") may result in the values of the parent measure 210, the first child measure 220a, the intermediate measure 240, the second child measure 220b, the third child measure 220c, and the fourth child measure 220d being divided into multiple sets of values, each of which corresponding to one of the root values of the dimension (e.g., "Canadian Dollar," "Euro," and "United States Dollar").

In some example embodiments, the addition of a dimension having multiple root values may expand the hierarchical measure 200 into a single hierarchy having additional nodes for the values the parent measure 210, the first child measure 220a, the intermediate measure 240, the second child measure 220b, the third child measure 220c, and the fourth child measure 220d that correspond to the different root values of the dimension. Alternatively and/or additionally, the addition of a dimension having multiple root values may expand the hierarchical measure 200 into multiple hierarchies, each of which corresponding to one of the root values of the dimension.

At 416, the analytics engine 110 may receive, via the graphic user interface, a fourth indication to expand the first measure, the second measure, or the third measure. In some example embodiments, a measure whose value corresponds to an aggregate of one or more additional measures may be expanded, for example, with the additional measures as child measures. Accordingly, the graphic user interface 125 be configured to receive one or more inputs that select at least one measure for expansion into one or more constituent measures.

At 418, the analytics engine 110 may respond to the fourth indication by at least expanding the hierarchical measure to include one or more additional child measures whose aggregate value corresponds to a value of the first measure, the second measure, or the third measure. For example, FIG. 3G shows that the second child measure 220b may be expanded into one or more additional child measures including, for example, a fifth child measure 310a, a sixth child measure 310b, and a seventh child measure 310c. The value of the second child measure 220b may correspond to an aggregate of the individual values of the fifth child measure 310a, the sixth child measure 310b, and the seventh child measure 310c. For instance, as shown in FIG. 3G, the measure "Cost of Goods Sold," which itself may be a child measure of the intermediate measure "Total Expenses," may be expanded into additional child measures including, for example, "Cost of Goods Sold|Accessories," "Cost of Goods Sold|Footwear," and "Cost of Goods Sold|Apparel." The value of the measure "Cost of Goods Sold" may correspond to a sum of the respective values of the measures "Cost of Goods Sold|Accessories," "Cost of Goods Sold|Footwear," and "Cost of Goods Sold|Apparel."

At 420, the analytics engine 110 may update the graphic user interface to display a waterfall chart corresponding to the hierarchical measure. In some example embodiments, the analytics engine 110 may update the graphic user interface 125 to display the waterfall chart 250, which may corresponding to the hierarchical measure 200. As noted, the waterfall chart 250 may include bricks and/or columns whose relative dimensions and/or placement along a baseline axis depict the cumulative effect that the individual values of child measures may have on the value of a corresponding parent measure. For example, the example of the waterfall chart 250 shown in FIG. 2B may depict the cumulative effect that the individual values of the child measures "Net Revenue," "Cost of Goods Sold," "General and Administrative Expenses," and "Taxes" may have on the parent measure "Income Statement." Alternatively and/or additionally, the example of the waterfall chart 250 shown in FIG. 2E may depict the cumulative effect that the individual values of the child measure "Net Revenue" and the intermediate measure "Total Expenses" may have on the parent measure "Income Statement." Moreover, the example of the waterfall chart 250 shown in FIG. 2E may also depict the cumulative effect that the individual values of the child measures "Cost of Goods Sold," "General and Administrative Expenses," and "Taxes" may have on the intermediate measure "Total Expenses."

Figure 5:
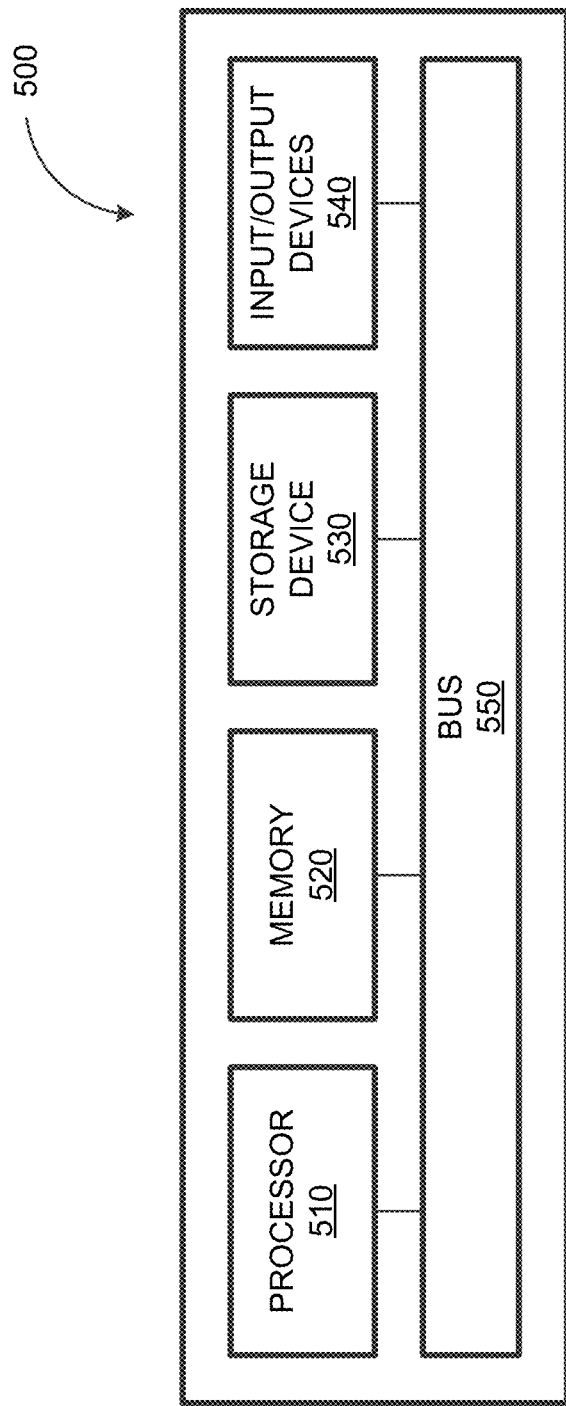
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the analytics engine 110 and/or any components therein.

As shown in FIG. 5, the computing system 500 can include a processor 510, a memory 520, a storage device 530, and input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the analytics engine 110. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, a tape device, a solid-state device, and/or any other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
   generating a graphic user interface configured to receive one or more inputs for constructing, based at least on data stored in a database, a hierarchical measure;
   receiving, via the graphic user interface, a first indication to add, to the hierarchical measure, a first measure and a second measure;
   responding to the first indication by at least constructing the hierarchical measure to include, based at least on the first measure being added prior to the second measure, the first measure as a parent measure and the second measure as a child measure, a first value of the first measure corresponding to an aggregate of at least a second value of the second measure;
   receiving, via the graphic user interface, a second indication to add a dimension to the hierarchical measure;
   responding to the second indication by at least dividing the first measure and the second measure into one or more sets of values corresponding to one or more root values associated with the dimension, the first measure and the second measure being divided into a first set of values corresponding to a first root value of the dimension and a second set of values corresponding to a second root value of the dimension; and
   updating the graphic user interface to at least provide a visual representation of the hierarchical measure.

2. The system of claim 1, wherein the graphic user interface is updated to display a waterfall chart, wherein the waterfall chart includes a first column having a first size and/or a first placement along a baseline axis corresponding to the first value of the first measure, and wherein the waterfall chart further includes a second column having a second size and/or a second placement along the baseline axis corresponding to the second value of the second measure.

3. The system of claim 1, further comprising:
receiving, via the graphic user interface, a third indication to add and/or designate a third measure as an intermediate measure; and
responding to the third indication by at least constructing the hierarchical measure to include the third measure as another child measure of the first measure.

4. The system of claim 3, wherein the second measure remains the child measure of the first measure based at least on the third measure succeeding the second measure, and wherein the first value of the first measure aggregates the second value of the second measure and a third value of the third measure.

5. The system of claim 3, wherein the second measure becomes a child measure of the third measure based at least on the third measure preceding the second measure, and wherein the first value of the first measure aggregates a third value of the third measure but not the second value of the second measure.

6. The system of claim 1, wherein the hierarchical measure is expanded as a single hierarchy having additional nodes corresponding to the first set of values corresponding to the first root value of the dimension and the second set of values corresponding to the second root value of the dimension.

7. The system of claim 1, wherein the hierarchical measure is expanded into a first hierarchy and a second hierarchy, wherein the first hierarchy corresponds to the first set of values associated with the first root value of the dimension, and wherein the second hierarchy corresponds to the second set of values associated with the second root value of the dimension.

8. The system of claim 1, further comprising:
receiving, via the graphic user interface, a third indication to expand the first measure and/or the second measure; and
responding to the third indication by at least expanding the hierarchical measure to include one or more additional child measures whose aggregate value corresponds to the first value of the first measure and/or the second value of the second measure.

9. The system of claim 1, wherein the graphic user interface includes a first graphic control element configured to receive the first indication to add the first measure and/or the second measure.

10. The system of claim 9, wherein the graphic user interface further includes a second graphic control element configured receive a third indication to remove, from the hierarchical measure, the first measure and/or the second measure.

11. The system of claim 10, wherein the first graphic control element and/or the second graphic control element comprise a button, a slider, a list box, a spinners, a drop-down list, a menu, a menu bar, a toolbar, an icons, and/or a text box.

12. A computer-implemented method, comprising:
generating a graphic user interface configured to receive one or more inputs for constructing, based at least on data stored in a database, a hierarchical measure;
receiving, via the graphic user interface, a first indication to add, to the hierarchical measure, a first measure and a second measure;
responding to the first indication by at least constructing the hierarchical measure to include, based at least on the first measure being added prior to the second measure, the first measure as a parent measure and the second measure as a child measure, a first value of the first measure corresponding to an aggregate of at least a second value of the second measure;
receiving, via the graphic user interface, a second indication to add a dimension to the hierarchical measure;
responding to the second indication by at least dividing the first measure and the second measure into one or more sets of values corresponding to one or more root values associated with the dimension, the first measure and the second measure being divided into a first set of values corresponding to a first root value of the dimension and a second set of values corresponding to a second root value of the dimension; and
updating the graphic user interface to at least provide a visual representation of the hierarchical measure.

13. The method of claim 12, wherein the graphic user interface is updated to display a waterfall chart, wherein the waterfall chart includes a first column having a first size and/or a first placement along a baseline axis corresponding to the first value of the first measure, and wherein the waterfall chart further includes a second column having a second size and/or a second placement along the baseline axis corresponding to the second value of the second measure.

14. The method of claim 12, further comprising:
receiving, via the graphic user interface, a third indication to add and/or designate a third measure as an intermediate measure; and
responding to the third indication by at least constructing the hierarchical measure to include the third measure as another child measure of the first measure.

15. The method of claim 14, wherein the second measure remains the child measure of the first measure based at least on the third measure succeeding the second measure, and wherein the first value of the first measure aggregates the second value of the second measure and a third value of the third measure.

16. The method of claim 14, wherein the second measure becomes a child measure of the third measure based at least on the third measure preceding the second measure, and wherein the first value of the first measure aggregates a third value of the third measure but not the second value of the second measure.

17. The method of claim 12, further comprising:
receiving, via the graphic user interface, a third indication to expand the first measure and/or the second measure; and
responding to the third indication by at least expanding the hierarchical measure to include one or more additional child measures whose aggregate value correspond to the first value of the first measure and/or the second value of the second measure.

18. A non-transitory computer readable medium storing instructions, which when executed by at least one data processor, result in operations comprising:
generating a graphic user interface configured to receive one or more inputs for constructing, based at least on data stored in a database, a hierarchical measure;
receiving, via the graphic user interface, a first indication to add, to the hierarchical measure, a first measure and a second measure;
responding to the first indication by at least constructing the hierarchical measure to include, based at least on the first measure being added prior to the second measure, the first measure as a parent measure and the second measure as a child measure, a first value of the first measure corresponding to an aggregate of at least a second value of the second measure;

receiving, via the graphic user interface, a second indication to add a dimension to the hierarchical measure;

responding to the second indication by at least dividing the first measure and the second measure into one or more sets of values corresponding to one or more root values associated with the dimension, the first measure and the second measure being divided into a first set of values corresponding to a first root value of the dimension and a second set of values corresponding to a second root value of the dimension; and updating the graphic user interface to at least provide a visual representation of the hierarchical measure.

* * * * *